(12) United States Patent
Sugawara et al.

(10) Patent No.: US 6,504,523 B1
(45) Date of Patent: Jan. 7, 2003

(54) ACTIVE MATRIX LCD DEVICE

(75) Inventors: Noriaki Sugawara, Tokyo (JP);
Kimikazu Matsumoto, Tokyo (JP);
Kunimasa Itakura, Tokyo (JP);
Tatsuya Shiki, Tokyo (JP); Toshikazu Shimizu, Tokyo (JP); Shoichi Kuroha, Tokyo (JP); Shinichi Nishida, Tokyo (JP)

(73) Assignee: NEC Corporation, Tokyo (JP)

( * ) Notice: Subject to any disclaimer, the term of this patent is extended or adjusted under 35 U.S.C. 154(b) by 126 days.

(21) Appl. No.: 09/723,492

(22) Filed: Nov. 28, 2000

(30) Foreign Application Priority Data

Nov. 30, 1999 (JP) .......................................... 11-341393

(51) Int. Cl.[7] ................................................ G09G 3/36
(52) U.S. Cl. ........................................................ 345/98
(58) Field of Search ............................... 345/94, 96, 98

(56) References Cited

U.S. PATENT DOCUMENTS 5,764,207 A * 6/1998 Maekawa et al. ........... 345/100
5,959,600 A * 9/1999 Uchino et al. .............. 345/100

FOREIGN PATENT DOCUMENTS

JP 7-159786 6/1995

* cited by examiner

Primary Examiner—Richard Hjerpe
Assistant Examiner—Naa-Oboshie C Alexander-Reindorf
(74) Attorney, Agent, or Firm—Choate, Hall & Stewart

(57) ABSTRACT

An active-matrix LCD device drives the LCD panel by using a dot reversible driving technique. The switching between two sets of input signals or two resolution modes is conducted by applying a DC voltage between the pixel electrode and the common electrode in each pixel before restart of the image display of a switched signal. The DC voltage has the same polarity among the pixels in the pixel array to thereby reduce the flicker after the restart of the image display.

16 Claims, 18 Drawing Sheets

| + | + | + | + |
|---|---|---|---|
| + | + | + | + |
| + | + | + | + |

FIG. 12B

| + ⊕ (I) | + ⊖ (C) | + ⊕ (I) | + ⊖ (C) |
|---|---|---|---|
| + ⊖ (C) | + ⊕ (I) | + ⊖ (C) | + ⊕ (I) |
| + ⊕ (I) | + ⊖ (C) | + ⊕ (I) | + ⊖ (C) |

FIG. 12C

| + ⊖ (C) | + ⊕ (I) | + ⊖ (C) | + ⊕ (I) |
|---|---|---|---|
| + ⊕ (I) | + ⊖ (C) | + ⊕ (I) | + ⊖ (C) |
| + ⊖ (C) | + ⊕ (I) | + ⊖ (C) | + ⊕ (I) |

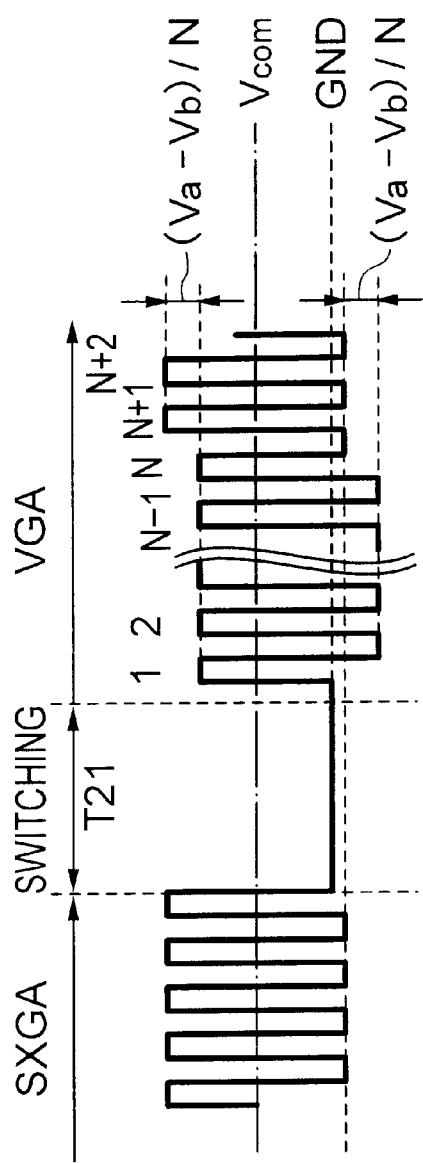
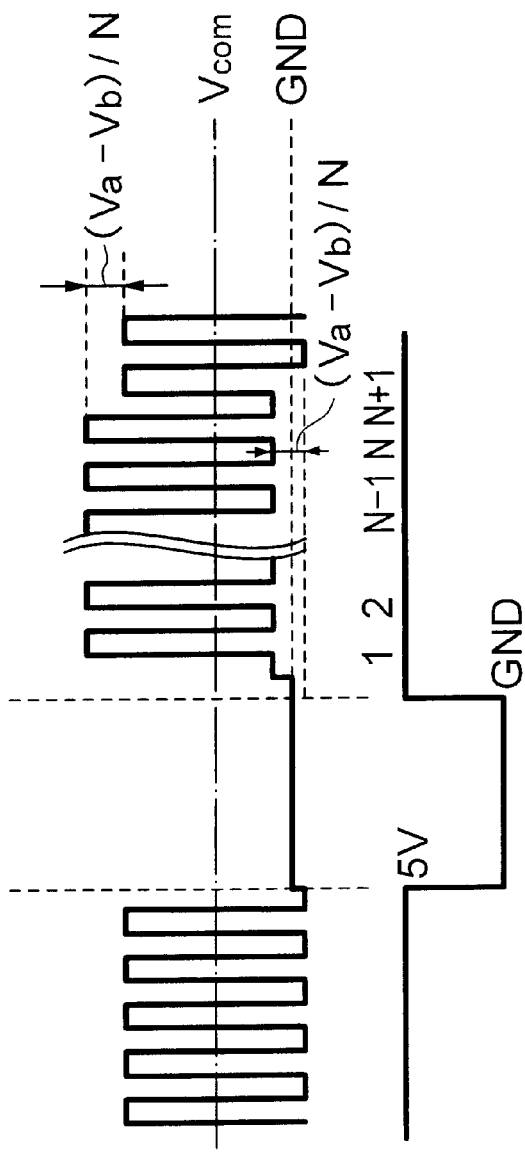
FIG. 15A
FIG. 15B
FIG. 15C

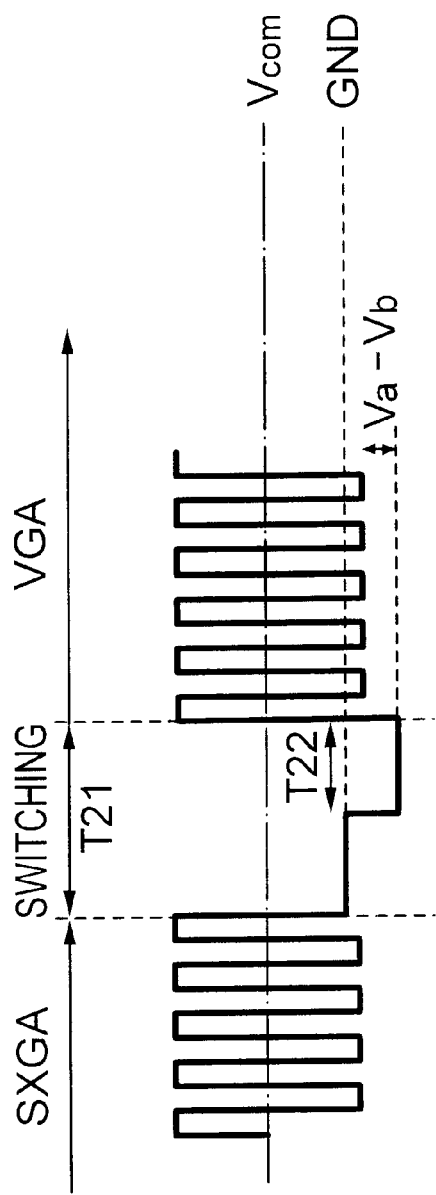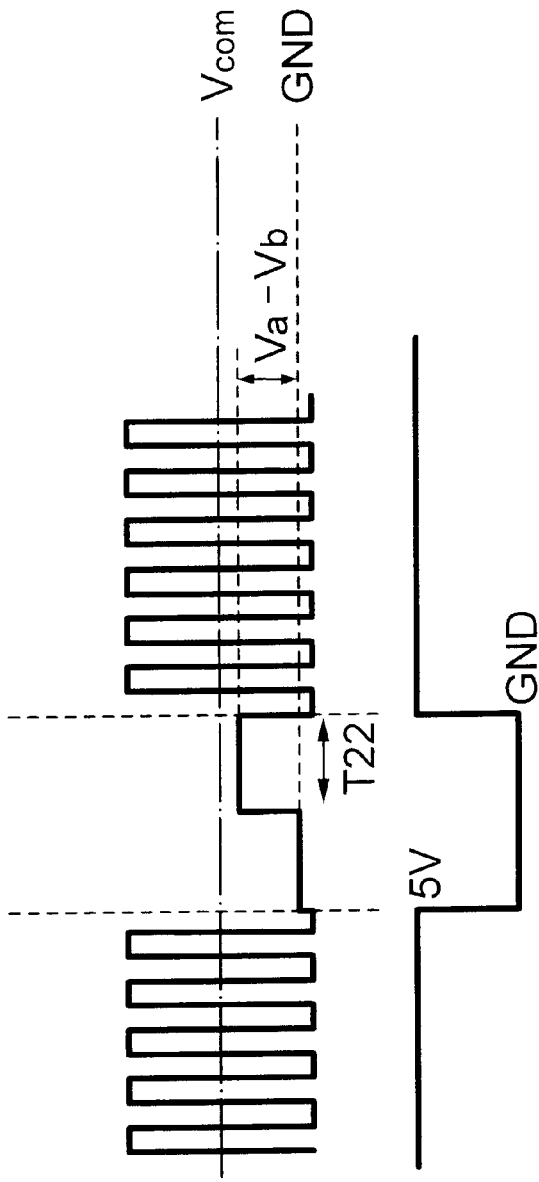
FIG. 18A  FIG. 18B  FIG. 18C

ACTIVE MATRIX LCD DEVICE

BACKGROUND OF THE INVENTION

1. Field of the Invention

The present invention relates to an active-matrix liquid crystal display (LCD) device and, more particularly, to a driving technique for driving the active-matrix LCD panel in the LCD device.

2. Description of the Related Art

An in-plane switching (IPS) mode active-matrix LCD (AM-LCD) panel uses a lateral electric field for driving the LC layer, the lateral electric field being parallel to the interface between the LC layer and the substrate surface. In the IPS mode AM-LCD panel, the LC layer should have a lower specific resistivity in order to prevent the residual image of the previous image from being displayed on the screen for a long time (See JP-A-7-159786, for example). On the other hand, in a general AM-LCD panel, irrespective of either the IPS mode or a twisted nematic (TN) mode of the LCD panel, a mode switching function is generally used for switching between the display modes in resolution or for switching between two set of input sections.

For example, in the mode switching function between the display modes, either a higher resolution mode (SXGA) for displaying 1280×1024 pixels or a lower resolution mode (VGA) for displaying 640×480 pixels is selected on the screen by the user.

In the AM-LCD panel, the image signal is not supplied to the LCD panel for several seconds during the mode switching operation between the display modes or between the input sections. If the screen continues for displaying image during this switching period, large noise appears on the screen to degrade the image quality. Thus, it is generally employed in the AM-LCD to temporarily stop displaying the image on the screen during the switching operation.

Immediately after the LCD panel is restarted for image display following to the temporary stop of the image display, there is a phenomenon wherein a flicker appears on the screen for about 2 to 20 seconds. The cause of the flicker is considered as follows.

In a LCD device, an alternately driving technique is generally used for preventing degradation of the LC layer such as burning. In other words, the potential of the pixel electrode alternates in the polarity thereof with respect to the potential of the common electrode (or common electrode potential). For temporarily stopping the image display on the screen during the switching operation, it may be considered to equalize the pixel electrode potential with the common electrode potential at the ground potential, for example. However, this causes a difference in DC potential between both the electrodes.

The difference in the DC potential (DC potential difference) is caused by the fact that the common electrode immediately assumes the ground potential whereas the pixel electrode does not assume the ground potential during the switching operation due to a large discharge period of the pixel electrode. This is because the pixel electrode is grounded via the data line and the TFT in the pixel, which delay the discharge (or drainage) of the electric charge from the pixel electrode.

The DC potential difference reverses from pixel to pixel in the case of a dot reversible driving technique of the LCD panel, wherein the image signal is reversed in the polarity thereof pixel by pixel in both the column and row directions and also frame by frame in each pixel. The DC potential difference causes attachment of electric charge having an opposite polarity with respect to the polarity of the potential difference and an amount corresponding to the potential difference onto each of the pixel electrodes or the common electrodes. The attached electric charge generally remains on the electrode as residual electric charge after the LCD panel is restarted for image display from the temporary stop in the mode switching operation. The residual electric charge is superposed with the current image signal and lightens or darkens the screen every frame, thereby causing a flicker until the residual electric charge eventually disappears. The flicker has become more noticeably with the reduction of the specific resistivity of the LC layer.

The mechanism of the flicker problem will be described with reference to drawings. FIG. 1 shows an equivalent circuit diagram of each pixel in the pixel array of the LCD panel. The pixel includes a parallel branch including LC layer capacitor CL and LC layer resistor RL and connected through a capacitor C1 to the pixel electrode 210 and through a capacitor C2 to the common electrode 212. The capacitors C1 and C2 are formed by the LC layer and the pixel electrode 210 and the common electrode 212, respectively, sandwiching therebetween a passivation layer 213 as shown in FIG. 2A (and FIG. 2B) The pixel electrode 210 is connected to the source of TFT 206, the drain of which is connected to a corresponding data line. The gate of TFT 206 is connected to a corresponding gate line 202, whereas the common electrode 212 is connected to the common electrode line 204.

When a DC voltage is applied between the pixel electrode 210 and the common electrode 212 during the switching operation for resolution mode or selection of input signals, with the pixel electrode 210 having a positive polarity with respect to the common electrode 212, positive electric charge in the LC layer moves toward the common electrode 212 as schematically shown by an arrow in FIG. 2A. The positive electric charge, after reaching the vicinity of the common electrode 212, forms a residual electric charge and applies an electric field in the direction from the common electrode 212 to the pixel electrode 210 as shown by an arrow in FIG. 2B.

FIG. 3 shows a timing chart of potentials of electrodes and nodes in the LCD panel of FIG. 1 for a switching operation, wherein the input of the data line is switched from an input signal A to an input signal B. In FIG. 3, gate line potential, data lien potential, pixel electrode potential and common electrode potential are represented by $V_G$, $V_D$, $V_{PI}$ ($V_{PI}'$) and Vcom. After the input signal A having a positive polarity is input through the data line, the potential $V_G$ of the gate line 202 rises from a Vgoff level (−10 volts, for example) to a Vgon level (19 volts, for example) at time instant t1, whereby the TFT 206 is turned on to deliver the input signal A to the pixel electrode, which holds the voltage level until the power supply is switched off at t6. In FIG. 3, only a bias voltage applied to the data line is depicted as the potential $V_D$ of the data line, with the signal voltage superposed thereon being omitted The potential $V_G$ of the gate line 202 rises at t2 from $V_{gon}$ level to $V_{goff}$ level, which is maintained on the gate line 202 until t6. The common electrode potential Vcom assumes a constant level (4.5 volts, for example) until t6. The input signal A is switched off by a data driver at t3 from the data line 200, although the voltage level $V_D$ is maintained on the data line 200 until t4, at which a an absence signal is delivered indicating that the input signal is not supplied from the data driver.

The time period T1 between time t3 at which the input signal A is switched off and time t4 at which the absence signal is delivered corresponds to the time needed for the video signal processor receiving the input video signal to judge the absence of the input signal, and may be 40 milliseconds, for example. The time period T2 between time t4 and time t6 at which the power supply for the LCD panel is switched off corresponds to the time needed for switching off the power supply after the judgement of the absence of the input signal, and may be 5 milliseconds, for example. The time period T3 between time t6 and time t7 at which the input signal B is switched on corresponds to a waiting time for waiting a new input signal, and may be 300 milliseconds, for example.

The power source for the data driver is switched off at time t4 at which the absence signal is delivered indicating the absence of the input signal, whereby the potential of the data line falls and assumes the ground potential at time t5.

At time t6, the power source for the LCD device is switched off, and the gate line 202 and the common electrode line 204 are directly aplied with the ground potential, whereby the gate line potential $V_G$ and the common electrode potential Vcom immediately assume the ground level whereas the pixel electrode potential $V_{PI}$ gradually falls to the ground level due to the discharge via the TFT. This causes a positive DC voltage difference $\Delta V$ between the pixel electrode 210 and the common electrode 212.

On the other hand, if the input signal A has a negative polarity in the pixel, a negative DC voltage difference $-\Delta V$ is generated between the potential $V_{PI}'$ of the pixel electrode 210 and the potential Vcom of the common electrode 212, as shown in FIG. 3. These DC voltage differences $\Delta V$ and $-\Delta V$ cause flicker on the screen due to the attachment of the electric charge having an opposite polarity to the vicinity of the pixel electrode 210.

It is assumed that the LCD device uses a dot reversible driving technique, and that the polarities of the pixel electrodes for a group of pixels after the input signal A is turned off and before the input signal B is switched on are such that shown in FIG. 4A, that is, the group (3×3) of pixel electrodes stores electric charges in the staggered pattern shown in FIG. 4A. In the assumed case, the pattern of the residual charges for the pixel is the inverse of the staggered pattern of FIG. 4A, as shown in FIG. 4B, whereby the residual charges cancel or reduces the potentials held on the pixel electrodes.

After the input signal B is switched on in the subsequent frame, the polarities of the pixels are reversed from the pattern of the input signal in the pervious frame shown in FIG. 4A, whereby the potentials of the input signals supplied to the pixel electrodes are intensified by the residual charges, as shown in FIG. 4C. In the further subsequent frame, the input signal pattern changes to the pattern shown in FIG. 4B due to the reversible driving technique, whereby the residual charge cancels or reduces the potentials of the input signals on the pixel electrodes. In other words, the residual charges reduce the signal charges in the odd-numbered frames, whereas the residual charges intensify the signal charges in the even-numbered frames. This causes a flicker having a frequency corresponding to the frame frequency, is more likely to generate in the case of IPS mode LCD panel. The flicker is observed more noticeably in the case of a LC layer having a lower specific resistivity, especially in the case of specific resistivity of $1\times10^{13}$ $\Omega$-cm or lower due to a higher mobility of the charge in the LC layer and a higher electric field generated by the residual charges A similar flicker problem arises in the case of a frame reversible driving scheme, a scanning-line reversible driving scheme, and a data-line reversible driving scheme other than the dot reversible driving scheme. The term "reversible driving scheme" as used in this text without addition of any modification means either the dot reversible driving scheme, the scanning-line reversible driving scheme or the data-line reversible driving scheme.

SUMMARY OF THE INVENTION

In view of the above, it is an object of the present invention to provide an AM-LCD device which is capable of preventing a flicker during the switching operation for the resolution modes or the input signals.

The present invention provides an active-matrix LCD (AM-LCD) device including a pixel array including a plurality of pixels arranged in a matrix, each of the pixels having a pixel transistor, a pixel electrode connected to a source of the pixel transistor and a common electrode, a plurality of data lines each connected to a drain of each pixel transistor arranged in a column of the pixel array, a plurality of gate lines each connected to a gate of each pixel transistor arranged in a row of the pixel array, a data drive block for driving the data lines, a gate driver block for driving the gate lines, a switching section for switching power source for the pixel array, a control section for controlling the data driver block, the gate driver block and the switching section to drive the pixel array in a reversible driving scheme, wherein the control section controls a mode switching so that a potential difference between the pixel electrode and the common electrode in each pixel has a uniform polarity among the pixels during a switching period after image data for the data line is switched off and before the power source for the pixel array is switched on for the mode switching.

In accordance with the LCD device of the present invention, the same polarity of the potential difference between the pixel electrode and the common electrode among the pixels affords reduction of the flicker caused by the residual charge.

The above and other objects, features and advantages of the present invention will be more apparent from the following description, referring to the accompanying drawings.

BRIEF DESCRIPTION OF THE DRAWINGS

Figures 4A, 4B, 4C:
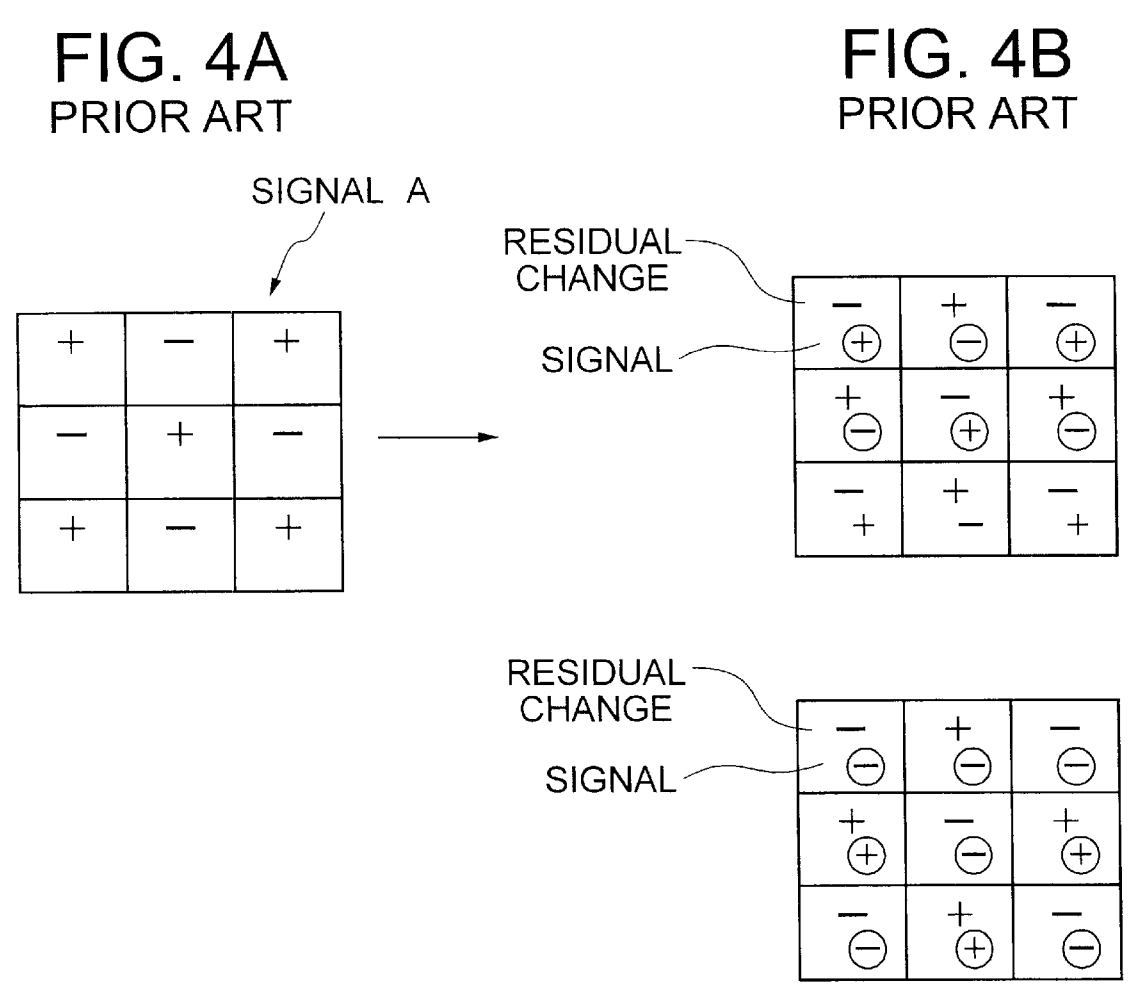

FIGS. 4A to 4C are schematic diagrams showing the pattern of polarities of the electric charge in the pixels of the LCD panel of FIG. 1.

FIGS. 12A to 12C are schematic diagrams showing the polarity patterns in the LCD device of FIG. 5.

FIGS. 15A to 15C are other timing charts of the signals in the LCD device of FIG. 13.

FIGS. 18A to 18C are timing charts of the signals in the LCD device of FIG. 13.

PREFERRED EMBODIMENTS OF THE INVENTION

Now, the present invention is more specifically described with reference to accompanying drawings.

Figure 1:
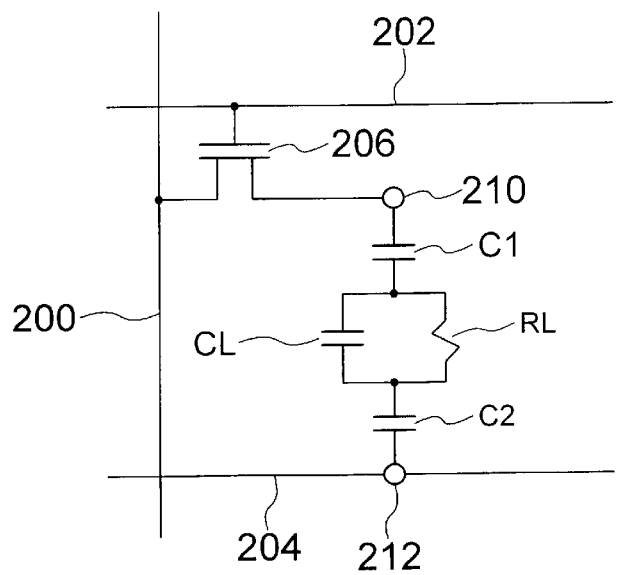
FIG. 1 is an equivalent circuit diagram of an IPS AM-LCD panel.
Figure 2A:
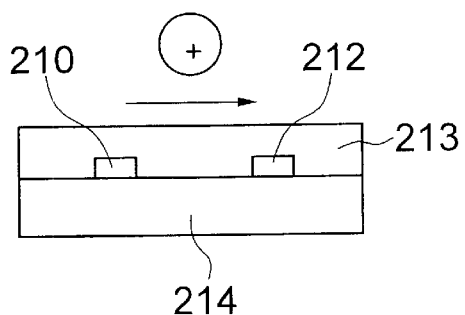
FIGS. 2A and 2B are schematic sectional views of the LCD panel of FIG. 1, showing operation of electric charge in the LC layer.
Figure 2B:
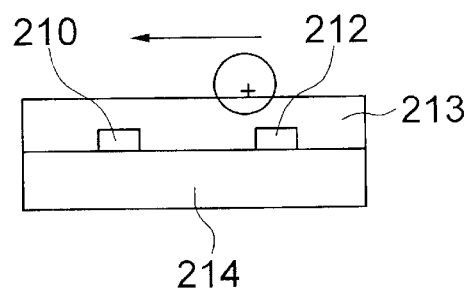
Figure 3:
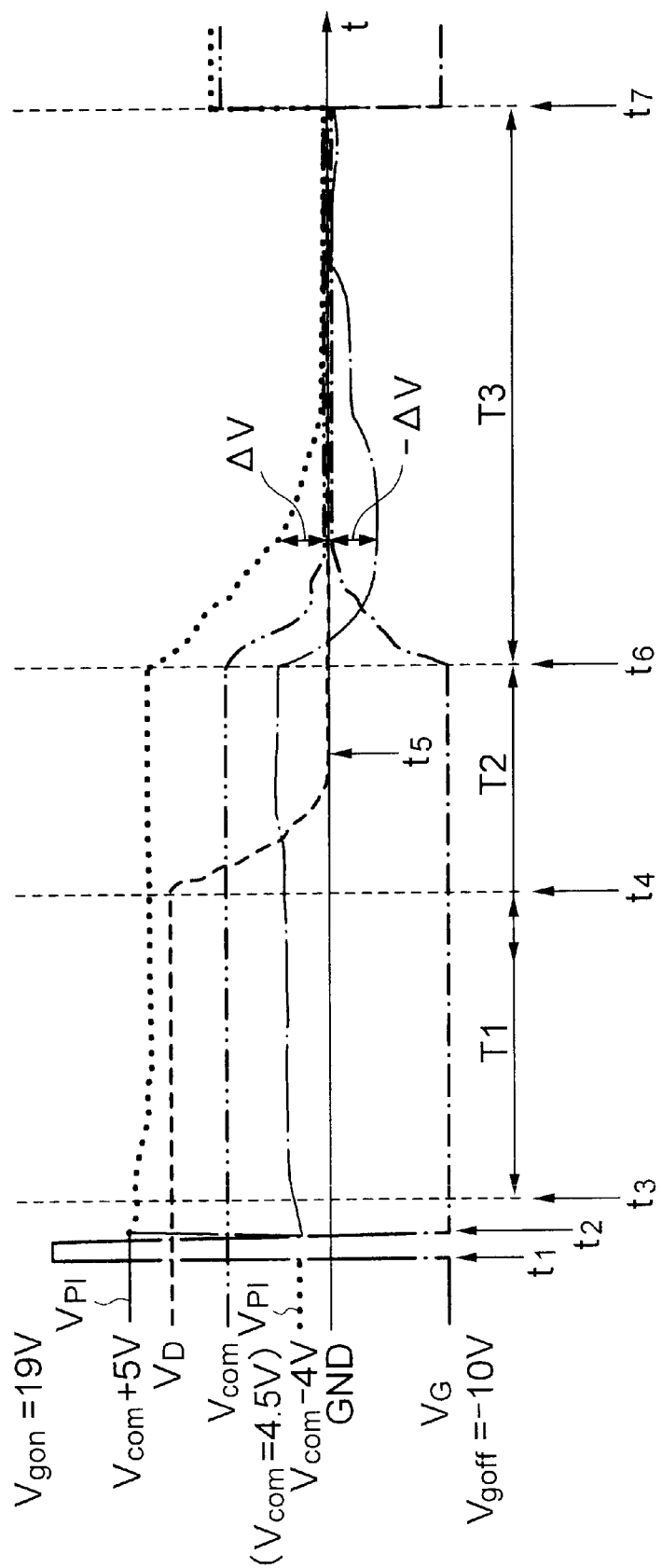
FIG. 3 is a timing chart of potentials of the electrodes and nodes in the LCD panel of FIG. 1.
Figure 5:
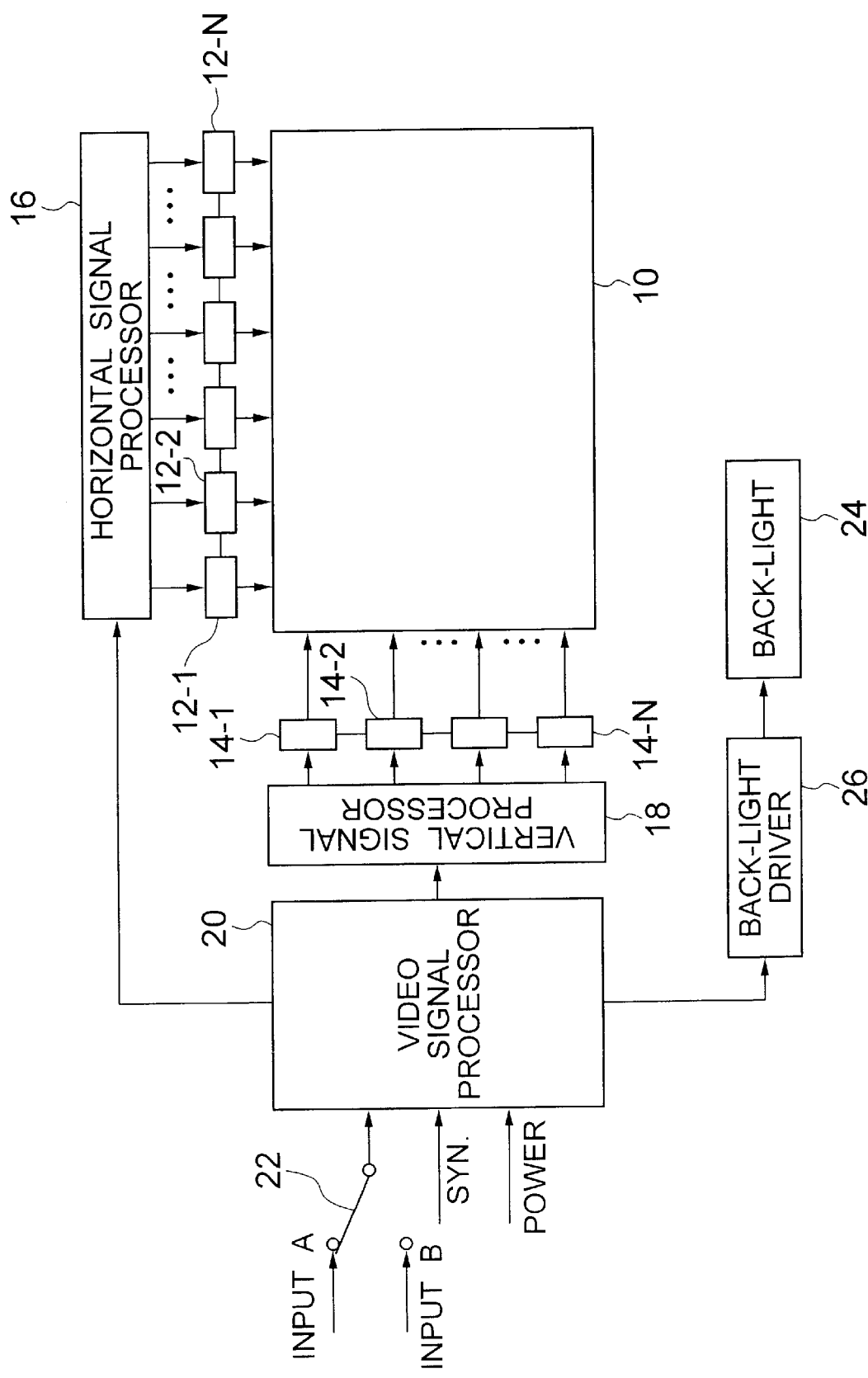
FIG. 5 is a block diagram of a LCD device according to a first embodiment of the present invention.

Referring to FIG. 5, an AM-LCD according to a first embodiment of the present invention includes: a pixel array 10 including a plurality of pixels (not shown) arranged in a matrix, a plurality of data lines (not shown) extending in the column direction of the matrix and a plurality of gate lines (not shown) extending in the row direction of the matrix; a data driver block including a plurality of data drivers 12-1 to 14-M each disposed. for a corresponding one of the data lines; a gate driver block including a plurality of gate drivers 14-1 to 14-N each disposed for a corresponding one of the gate lines; a horizontal signal processor 16 for delivering video input signals to the data drivers 12-1 to 12-M; a vertical signal processor 20 for delivering gate signals to the gate drivers 14-1 to 14-N; a video signal processor for receiving either an input signal A or input signal B to deliver the video input signals to the horizontal signal processor 16 and gate signals to the vertical signal processor 18; a switching member 22 for selecting either the input signal A or input signal B for the video signal processor 20; a back-light driver 26 for receiving a timing signal from the video signal processor 26; and back-light 24 driven by the back-light driver 26 to irradiate the CD panel from the rear side thereof.

Each pixel includes a TFT having a gate connected to a corresponding one of the gate lines, a drain connected to a corresponding one of the data lines and a source, a pixel electrode connected to the source of the TFT, and a common electrode connected to a common electrode line common to all the pixels.

The video signal processor 20 receives the input video signal and a synchronizing signal to generate image signals for the pixel array 10. The video signal processor 20 delivers a RGB video signal and a clock signal to the horizontal signal processor 16, a common electrode potential to the common electrode line, a gate voltage signal to the gate line. The video signal processor 20 also acts as a control section for the LCD device, and delivers a timing signal to the back-light driver 26 for controlling the back-light 24.

The switching member 22 switches between the input signal A and the input signal B based on an external signal.

Figure 6:
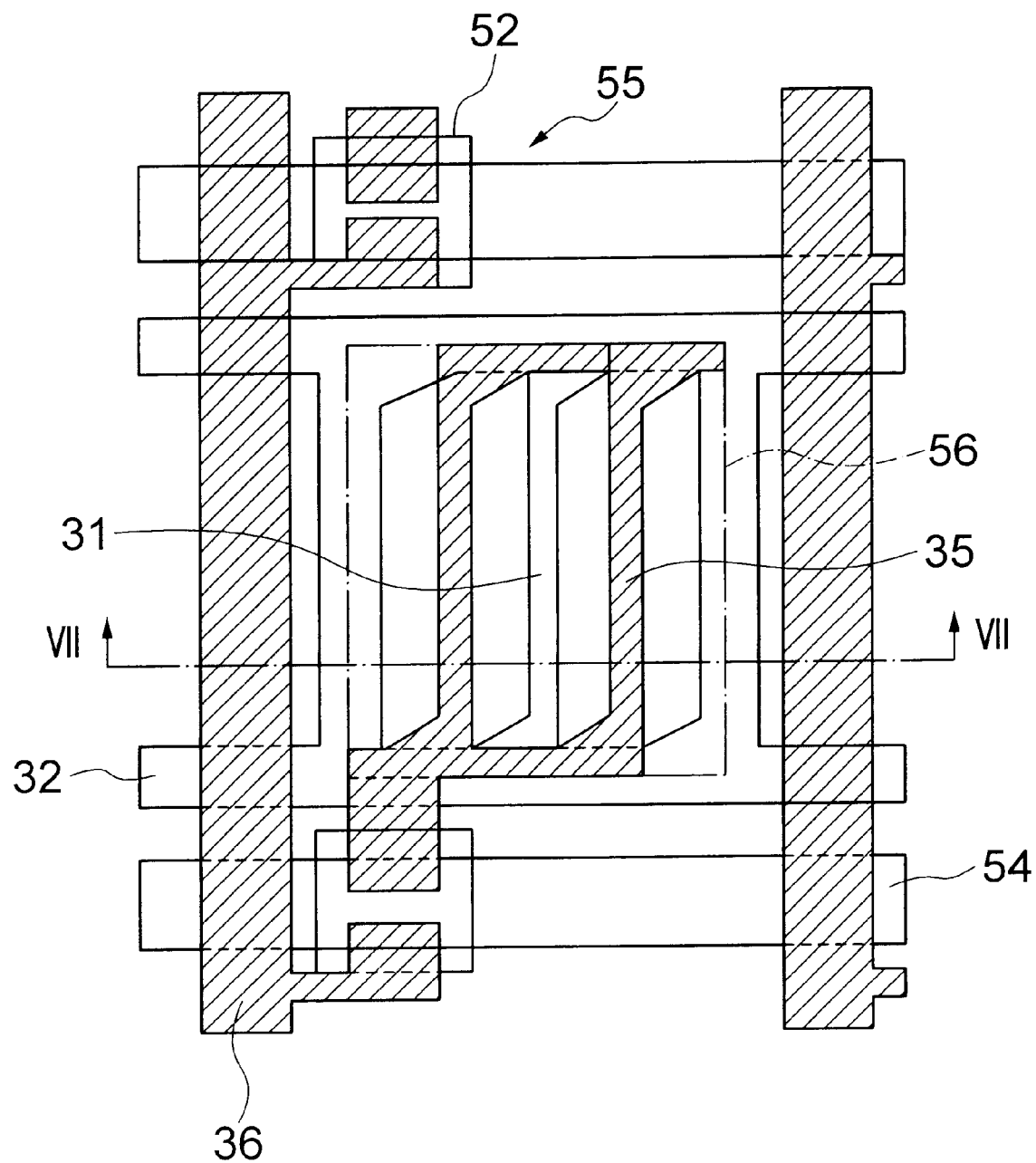
FIG. 6 is a top plan view of a pixel in the LCD device of FIG. 5.
Figure 7:
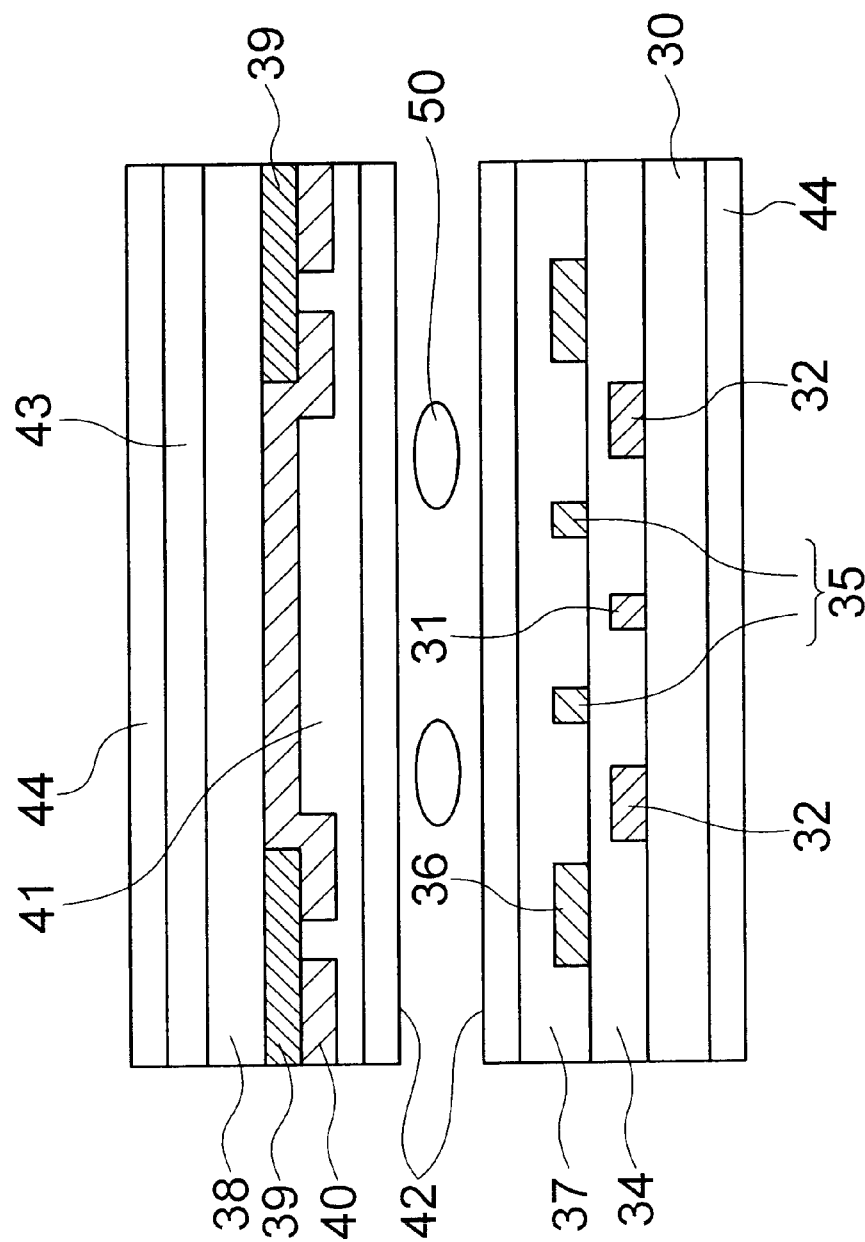
FIG. 7 is a sectional view taken along line VII—VII in FIG. 6.

Referring to FIGS. 6 and 7, each pixel in the pixel array 10 includes a pixel electrode 35 shown by hatching and a common electrode 31 for generating a lateral electric field therebetween. The common electrode 31 and the common electrode line 32 connected thereto are formed on the inner surface of a first transparent insulator substrate 30. A gate insulating film 34 is formed on the common electrode 31 and the common electrode line 32, the pixel electrode 35 and data lines 36 connected to the pixel electrode 35 via TFT 55 are formed on the gate insulating film 34. A protective insulator film 37 is formed on the pixel electrode 35 and the data line 37, and an orientation film 42 is formed on the protective insulator film 37. A polarizing plate 44 is attached onto the outer surface of the first transparent insulator substrate 30. The first insulator substrate 30 and the layered structure as described above constitute a first panel.

A second panel includes a second transparent insulator substrate 38, a black matrix 39 formed on the inner surface of the second transparent insulator substrate 38 and having an opening for each pixel for shielding the leakage light outside the pixels, a color filter layer 40 formed on the second insulator substrate 39 within the opening of the black matrix 39, an overcoat film 41 covering the entire surface including the black matrix 39 and the color filter film 40, and an orientation film 42 formed thereon. On the outer surface of the second substrate 38, a transparent conductive film 43 and a polarizing film 44 are consecutively formed.

The first panel and the second panel are disposed for opposing each other at a uniform gap, with spacers and a LC layer 50 being sandwiched therebetween. The LC layer 50 has a specific resistivity as low as $10^{12}$ Ω-cm for achieving removal of the residual image incurred by a fixed pattern displayed for a long time. In FIG. 6, gate line extends in a row direction, whereas the data line 36 extends in the column direction. An island amorphous silicon 52 is deposited on the gate insulator film 34 formed on the first transparent insulator substrate 30, doped with impurities such as phosphorous for implementing source/drain regions of the TFT 55, the drain and source of which are connected to the data line 36 and the pixel electrode 35, respectively.

Figure 8:
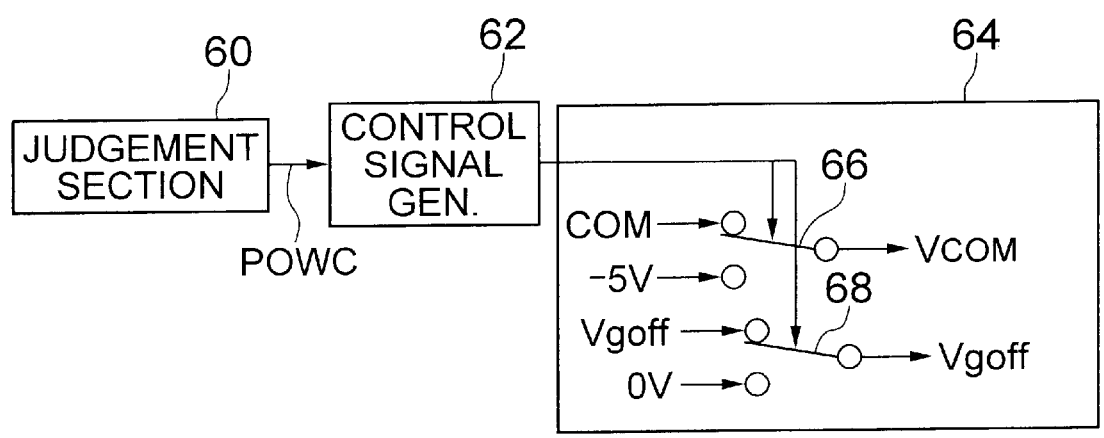
FIG. 8 is a block diagram of the principal part of the video signal processor shown in FIG. 5.

Referring to FIG. 8 showing a specified portion of the video signal processor 20, the video signal processor 20 includes a judgement section 60 for judging that the input signal voltage is not supplied to the data line to deliver an absence signal in a judgement signal POWC, a control signal generator 62 for responding to the absence signal to generate a control signal, and a switching section 64 for switching the output voltages.

Figure 9:
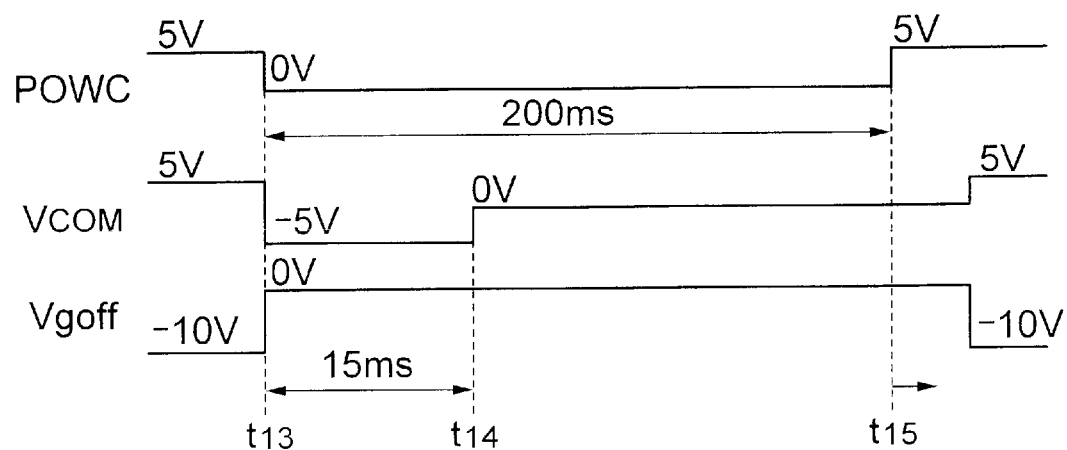
FIG. 9 is a timing chart of the signals in the video signal processor shown in FIG. 8.

The control signal from the control signal generator 62 is used for switching the potential Vcom of the common electrode and the potential $V_G$ of the gate line. Referring to FIG. 9, the judgment section delivers 5 volts as an inactive level in the judgement signal, and delivers zero volt as an absence signal. The common electrode potential Vcom is switched between COM (+5 volts) and −5 volts based on the judgement signal for the normal operation and assumes zero volt if the power source is off. The gate-off potential Vgoff for the gate line potential $V_G$ is switched by a switch 69 between −10 volts and zero volt based on the control signal from the control section 62. The output potentials Vcom and Vgoff control the gate drivers 14-1 to 14-N, whereby suitable potentials are delivered to respective sections.

Figure 10:
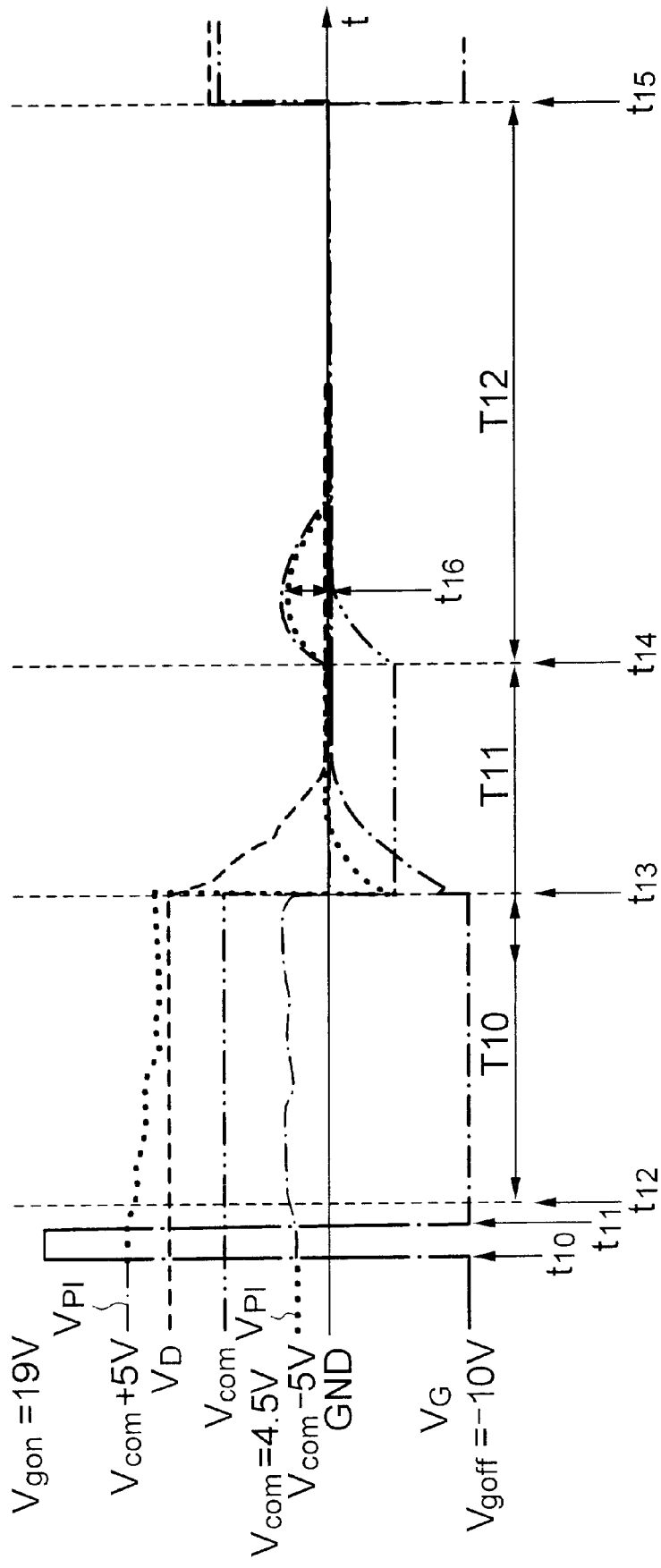
FIG. 10 is a timing chart of the potentials of the electrodes and nodes in the LCD device of FIG. 5.
Figure 11:
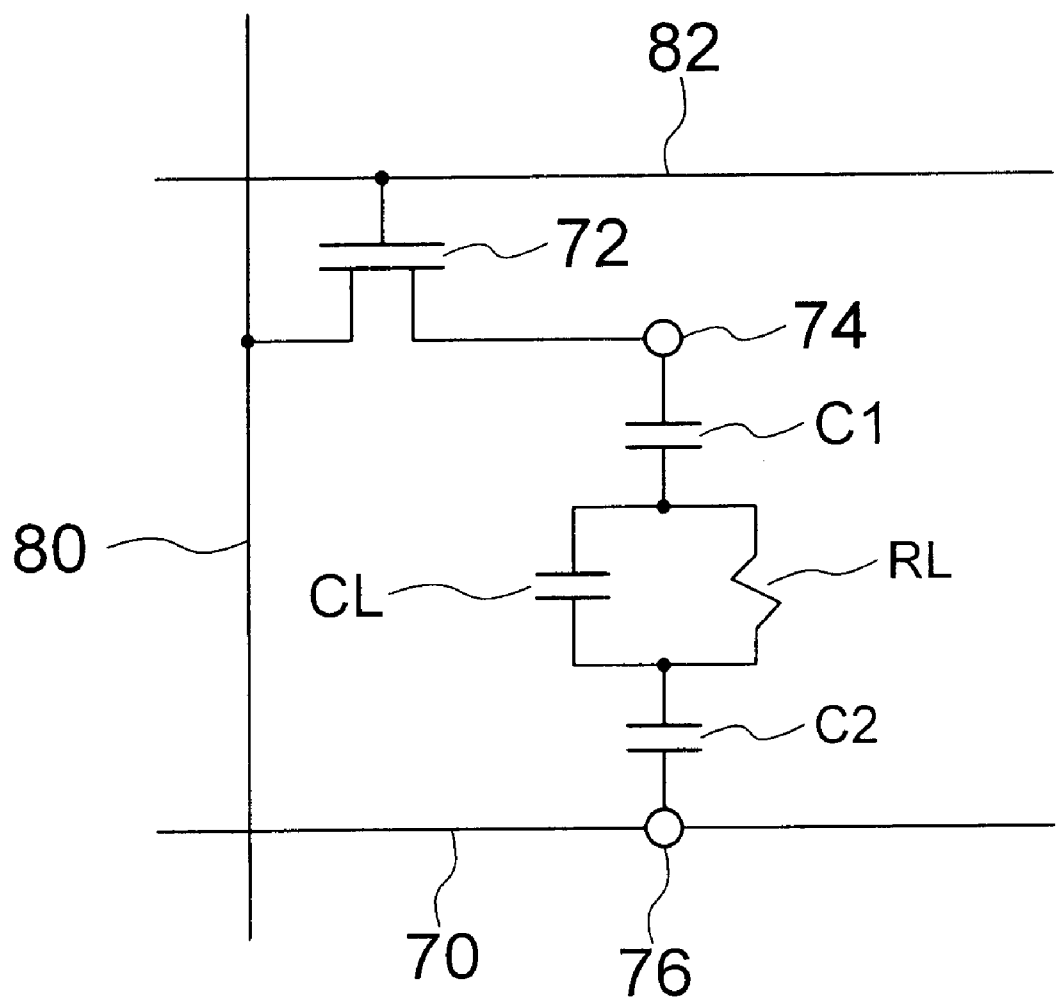
FIG. 11 is an equivalent circuit diagram of the pixel shown in FIG. 6.

FIG. 10 shows an example of signal timing chart in the case wherein the input signal A is selected as the video signal, and then the video signal is switched from the input signal A to the input signal B. Referring additionally to FIG. 11, for storing the input signal A in the pixel, the potential of the specified gate line 82 is switched from the gate-off voltage Vgoff (−10 volts) to the gate-on voltage Vgon (19 volts), whereby the TFT 72 is turned on and the potential of the input signal A on the data line 80 is delivered to the pixel electrode 74 for charging the capacitors CL, C1 and C2 in each pixel. Thus, the potential VPI' of the pixel electrode 74 assumes a specified potential. in FIG. 10, only a bias voltage $V_D$ is shown for the potential of the data line 80, with the signal voltage being omitted.

The potential of the gate line 82 changes at t1 from Vgon to Vgoff and assumes this level until the judgement signal POWC falls to an active low level at t13 due to the absence of the input signal voltage. The common electrode potential Vcom assumes a constant potential (5 volts, for example) until t13. The data line potential VD assumes the input voltage as it is delivered from the data driver until t14 at which the absence signal is delivered.

The time period T10 between time t12 at which the input signal is not delivered and time t13 at which the absence signal is delivered corresponds to the time needed for the video signal processor 20 detects the absence of the input voltage, and may be 40 milliseconds, for example. The time period T11 between t13 and t14 at which the power source is switched off from the LCD panel corresponds to the time needed for the switch-off and may be 5 milliseconds, for example. The time period T12 between t14 and t15 at which the input is switched to the input signal B corresponds to a waiting time for waiting the new signal and may be 300 milliseconds, for example.

The control signal generator 62 delivers the control signal to the switching section 64 at time t13 by responding to the absence signal. As a result, the potential Vcom of the common electrode 76 is switched from 5 volts to −5 volts, and the potential $V_G$ of the gate line 82 is switched from the gate-off voltage Vgoff (−10 volts) to zero volt. At the same time, the power source is switched off from the data driver at t13, whereby the potential $V_D$ of the data line gradually falls toward the ground potential.

Due to the fall of the potential Vcom of the common electrode 76 from 5 volts to −5 volts at t13, the potential VPI of the pixel electrode 74 falls by a voltage corresponding to the potential drop of the common electrode 76, and assumes a potential below the ground potential.

On the other hand, the potential $V_G$ of the gate line 82, or the gate potential of the TFT 72, rises from Vgoff (−10 volts) to zero volt to turn on the TFT 72. Since the data line 80 is already applied with the ground potential at this stage, the electric charge stored in the capacitors CL, C1 and C2 is discharged through the data line 80 until the potential $V_{PI}$ of the pixel electrode 74 falls to the ground potential.

Subsequently, the power source is switched off from the LCD panel at time t14, whereby the potential Vcom of the common electrode 76 rises from −5 volts to zero volt. With the rise of the potential Vcom, the potential $V_{PI}$ of the pixel electrode 74 rises from the ground potential until t16 at which the potential Vcom reaches the ground potential, and then falls toward the ground potential by the discharge.

Thus, the potential difference between the pixel electrode potential $V_{PI}$ and the common electrode potential Vcom becomes zero volt after the switch off of the power source for the LCD panel and before time t15 at which the input is switched to the input signal B.

In the above embodiment, a first case wherein the pixel electrode receives a positive potential as the input signal A is described. If the pixel electrode receives a negative potential as the input signal A in a second case, the difference between the potential $V_{PI}'$ of the pixel electrode and the common electrode potential in the second case is substantially equal to that in the first case, then changes similarly to the first case until t15 and eventually assumes substantially zero volt. Thus, the potential difference between the pixel electrodes and the common electrode have the same polarity (or uniform polarity) among the pixel electrodes in the pixel array.

In the above embodiment, it is exemplified that the potential difference between the pixel electrode and the common electrode eventually assumes zero volt. However, it is sufficient in the present invention that the potential differences in the pixels assume the same polarity among the pixels in the pixel array before switching of the input signal, or more specifically, before the power supply is switched off for the pixel array. For achieving the same polarity of the potential differences among the pixel electrodes, it is sufficient that the following relationship hold between the maximum pixel electrode potential $V_{PMAX}$ maintained during a normal operation and other potentials Vcom and $V_G$:

$$V_{PMAX}-(Vcomo-Vcom)<V_G+4 \text{ volts} \tag{1}$$

wherein Vcomo is the common electrode potential during the normal operation.

In other words, the video signal generator 20 which functions as a control section should control the gate drivers 14-1 to 14-N at the operational timing which satisfies the above potential relationship.

It is preferable that the time period during which $V_G=0$ volt and Vcom≦−4 volts satisfy is set at 5 milliseconds or above.

Figures 12A, 12B, 12C:
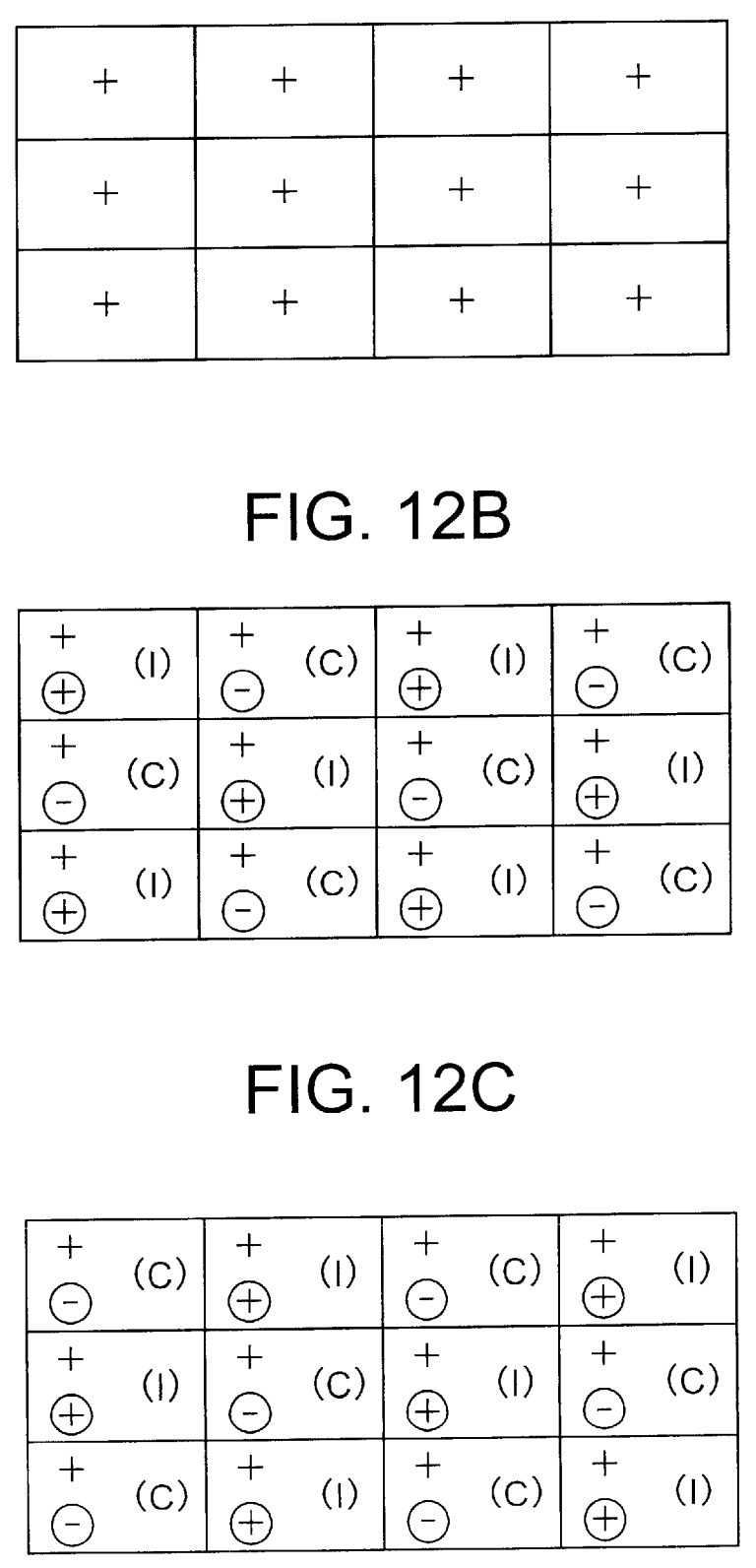

The effects and advantages of the same polarity of the potential differences among the pixels in the pixel array before the power source is switched off for the LCD panel 10 will be more specifically described below with reference to FIGS. 12A to 12C. As shown by the sign (+) in each of the pixels in FIG. 12A, all the pixels have the same positive polarity of the potential difference between the pixel electrode and the common electrode at t16 after the power source is switched off, due to the same positive polarity driving. In other words, all the residual electric fields are positive, as shown in FIG. 12A. Referring to FIGS. 12B and 12C, the positive or negative sign encircled in each of the pixels in FIGS. 12B and 12C indicates the polarity of the input signal B, which is supplied at t15 based on the dot reversible driving technique, FIG. 12B indicates the state of pixels in an odd-numbered frame whereas FIG. 12C indicates that in an even numbered frame, both the figures showing the state wherein the dot reversible driving signal is received after the state shown in FIG. 12A. The same sign for both the polarities in each pixel means that the electric field is intensified in the pixel whereas the opposite signs for both the polarities in each pixel means that the electric field is cancelled in the pixel. As understood from FIGS. 12B and 12C, the intensification (I) and the cancellation (C) of the electric field are opposite between the odd-numbered fame and the even-numbered frame in each pixel.

Although a flicker is generated in each of the pixels by noticing the each of the pixels between the frames, as understood from in FIGS. 12A and 12B, the flicker of the each of the pixels is cancelled between adjacent pixels and thus on the entire screen This is because the brightness of the pixels is averaged on the entire screen in each frame and is observed by the human eyes, which does not perceive the difference between the frames as a flicker due to the similar overall brightness between the frames.

In summary, for the switching operation between the input signals or resolution modes, by providing pixel data which allows all the pixels to have the same polarity between the pixel electrode potential and the common electrode potential before switch-off of the power source for the pixel array, the flicker can be prevented irrespective of the type of the reversible driving technique.

The video signal processor 20 may control the data drivers 12-1 to 12-M and gate drivers 14-1 to 14-N so that all the pixels in the pixel array receive black level before the switch-off of the power source. This allows a further improvement in the prevention of flicker. By providing the black level to all the pixels, the absolute difference between a pixel which receives a positive potential and another pixel which receives a negative potential is reduced, whereby the difference between the residual electric charges in the pixels can be reduced The suppression of generation of flicker is most effective to provide black level to all the pixels. However, only a part of the pixels may be supplied with the black data to achieve some effects. The term "black level" as used herein means the "black level" used in the IPSLCD which uses a normally black mode, and thus corresponds to the "white level" in the vertical electric field LCD, such as TNLCD, which uses a normally white mode.

The video signal processor 20 may control the gate drivers 14-1 to 14-N so that the potential difference between the pixel electrode and the common electrode have the same polarity among all the pixels after delivering the black level data to the pixel array and before the switching-off of the power source for the pixel array.

The video signal processor 20 may control the gate drivers 14-1 to 14-N at the specified timing which allows the above relationship:

$$V_{PMAX} - (Vcomo - Vcom) < V_G + 4 \text{ volts} \quad (1)$$

to satisfy among the potentials of the pixel electrode, the common electrode and the gate electrode after delivering the black level data to the pixel array and before the switching-off of the power source for the pixel array.

It is preferable that the specified timing further allows that the time period during which the relationships $V_G = 0$ volt and $Vcom \leq 14$ volts satisfy continues 5 milliseconds or more.

The video signal processor 20 may turn off the back-light during the switching operation for resolution mode or input signals, which prevents disordered image from being observed on the screen. On the other hand, if the video signal processor 20 controls to turn on the back-light during the switching operation, the flicker can be removed more quickly although the disordered image appears on the screen. The on-state of the back-light allows the TFT to increase the on-current thereof due to the irradiation, thereby accelerating the potential change in each pixel in the pixel array to obtain the same polarity of the potential difference in a short time.

An AM-LCD according to a second embodiment of the present invention has a configuration similar to the configuration of the AM-LCD of the first embodiment except for the control by the video signal processor 20. In the AM-LCD of the present embodiment, the video signal processor 20 controls the data driver 12-1 to 12-M so that each of the data lines receives an input signal superposed with a signal having an absolute voltage equal to the DC voltage applied between the pixel electrode and the common electrode and having an opposite polarity with respect to the DC voltage, after the switching operation is finished to restart reception of the input signal.

Figure 13:
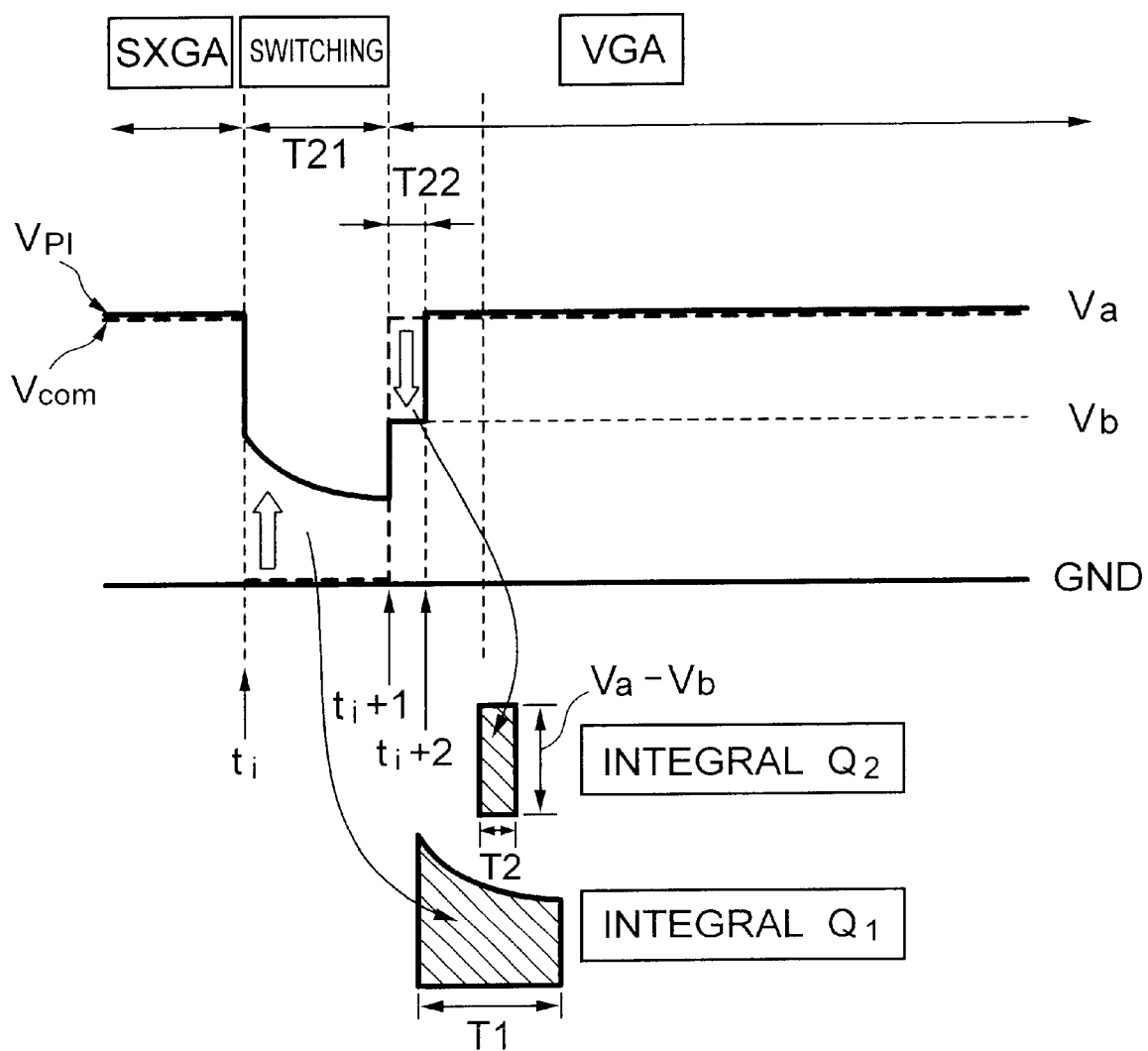
FIG. 13 is a schematic chart of a LCD device according to a second embodiment of the present invention.

FIG. 13 shows the principle of the control by the video signal processor 20 in the AM-LCD device of the present embodiment, wherein the switching operation is conducted for switching the resolution mode from the high resolution mode SXGA (1280×1024 pixels) to the low resolution mode VGA (640×480 pixels). After the image display for the high resolution mode is stopped at time ti in each of the pixels which stores the positive polarity between the pixel electrode and the common electrode, the common electrode is applied with the ground potential to immediately assume the ground potential, whereas the pixel electrode is applied with the ground potential via the TFT to gradually falls to the ground potential. Thus, as described in connection with the prior art, a potential difference or DC voltage V0 having a positive polarity is applied between the pixel electrode and the common electrode during the time period T21 between ti and ti+1 at which input of the signal for the lower resolution mode is started.

A DC voltage Va–Vb having an opposite polarity with respect to the DC voltage is applied in the present embodiment during a time period T22 between ti+1 and ti+2 while controlling the DC voltage and/or the time period T22 for canceling the integral Q1, which is an integral of the DC voltage with respect to time during the time period T21 between ti and ti+1, by using the integral Q2 which is an integral of the DC voltage with respect to time during the time period T22. The control of the DC voltage and/or the time period is conducted to obtain the integral Q2 which is equal the integral Q1 for a complete cancellation.

This allows the residual electric charge stored in each pixel to diffuse quickly toward the LC layer during the switching operation, thereby preventing the flicker on the screen caused by the residual electrode charge.

The operation as described above applies to the switching between input signals as well as the switching of resolution mode. Although FIG. 13 shows an exemplified case wherein a positive potential signal is stored in the pixel before the switching operation, a similar operation occurs in the case wherein a negative potential signal is stored with the polarities of the potentials being reversed. Thus, description of the latter case is omitted herein for avoiding duplication.

An example of the second embodiment of the present invention will be described with reference to FIGS. 14A to 14C, which show the signal waveforms in the dot reversible driving technique. In the illustrated example, the diffusion of the electric charge stored in each pixel to the LC layer is accelerated by applying, during only the first frame. a signal having an opposite polarity with respect to the DC voltage stored in the each pixel before the switching to prevent the generation of flicker. In this case, a DC voltage Va–Vb having an opposite polarity is applied in such a way that the product (or integral) Q2 of the time period T22, during which the DC voltage is applied, by the DC voltage Va–Vb does not exceed the integral Q1 of the DC voltage V0 with respect to time within the time period T21, i.e., $Q1 \geq Q2$. On the other hand, if Q1=Q2 is achieved, generation of the flicker is avoided, whereas if Q1>Q2, the flicker is reduced.

Figure 14A:
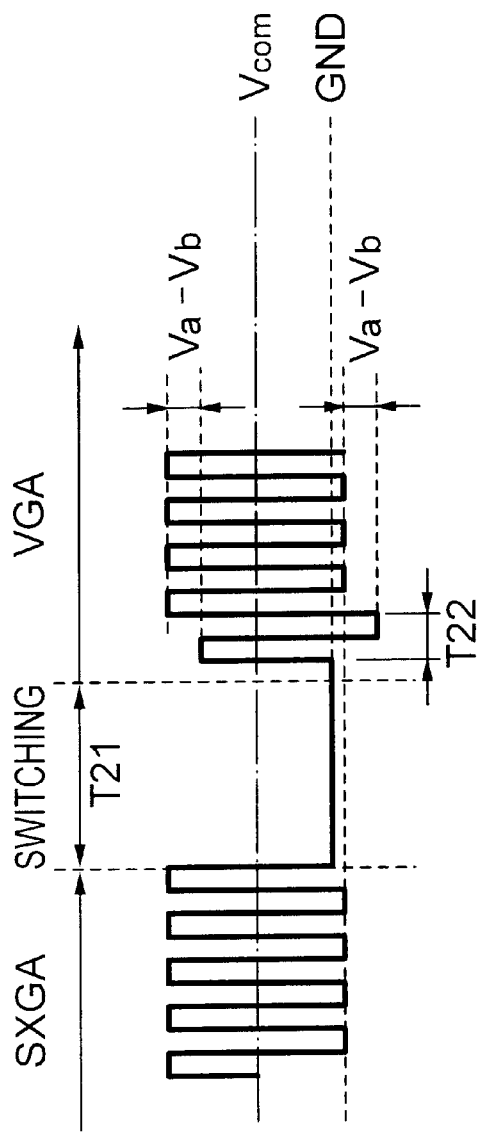
FIGS. 14A to 14C are timing charts of signals in the LCD device of FIG. 13.

FIG. 14A shows a signal waveform supplied to the data line corresponding to a pixel in which a positive polarity signal is stored before switching-off of the power source for switching the resolution mode, in the case of the dot reversible driving technique. FIG. 14B shows a signal waveform supplied to the data line corresponding to a pixel in which a negative polarity signal is stored before switching-off of the power source. FIG. 14C shows the signal timing of the absence signal in the judgment signal POWC delivered from the judgement section 60.

As understood from FIG. 14A, an input signal superposed with a signal voltage having an opposite polarity with respect to the stored positive input signal, i.e., a negative DC voltage, having an absolute DC voltage Va–Vb is applied during the first frame after the restart of the driving to the pixel in which a positive polarity signal is stored before the switch-off, and a normal input signal is applied to the same pixel from the start of the next frame.

Figure 14B:
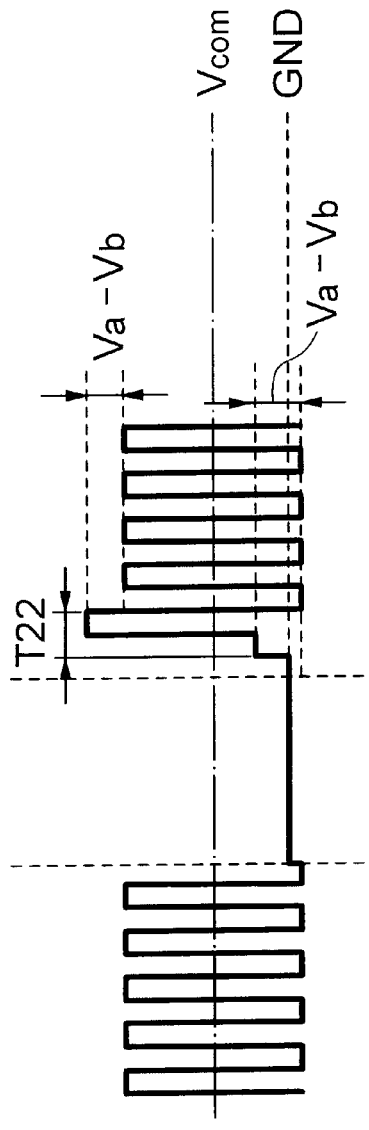

On the other hand, as shown in FIG. 14B, an input signal superposed with a signal having an opposite polarity with respect to the stored negative input signal, i.e., a positive DC voltage Va–Vb is applied during the first frame to a pixel in which a negative polarity signal is stored before the switch-off, and a normal input signal is applied to the same pixel from the start of the next frame.

A second example of the second embodiment of the present invention will be described with reference to FIGS. 15A to 15C, which show the signal waveforms in the dot reversible driving technique. In the illustrated example, the diffusion of the electric charge stored in each pixel to the LC layer is accelerated by applying, during N frames, a signal having an opposite polarity with respect to the DC voltage stored in the each pixel before the switching, to prevent the generation of flicker. In this case, a signal voltage Va–Vb having an opposite polarity is applied in such a way that the product (or integral) Q2 of the time period T22, during which the DC voltage is applied, by the DC voltage (Va–Vb)/N does not exceed the integral Q1 of the DC voltage V0 with respect to time within the time period T21, i.e., Q1≧Q2. If Q1=Q2 is achieved, generation of the flicker is avoided, whereas if Q1>Q2, the flicker is reduced.

FIG. 15A shows a signal waveform supplied to the data line corresponding to a pixel in which a positive polarity signal is stored before switching-off of the power source for switching the resolution mode, in the case of the dot reversible driving technique. FIG. 15B shows a signal waveform supplied to the data line corresponding to a pixel in which a negative polarity signal is stored before switching-off of the power source. FIG. 15C shows the signal timing of the absence signal in the judgement signal POWC delivered from the judgement section 60.

As understood from FIG. 15A, an input signal superposed with a signal voltage having an opposite polarity with respect to the stored positive DC voltage, i.e., a negative DC voltage, having an absolute voltage (Va–Vb)/N is applied during the N frames after the restart of the driving to the pixel in which a positive polarity signal is stored before the switch-off, and a normal input signal is applied to the same pixel from the start of the (N+1)th frame.

On the other hand, as shown in FIG. 15B, an input signal superposed with a signal having an opposite polarity with respect to the stored negative DC voltage, i.e., a positive DC voltage Va–Vb is applied during the N frames to a pixel in which a negative polarity signal is stored before the switch-off, and a normal input signal is applied to the same pixel from the start of the (N+1)th frame.

Figure 16:
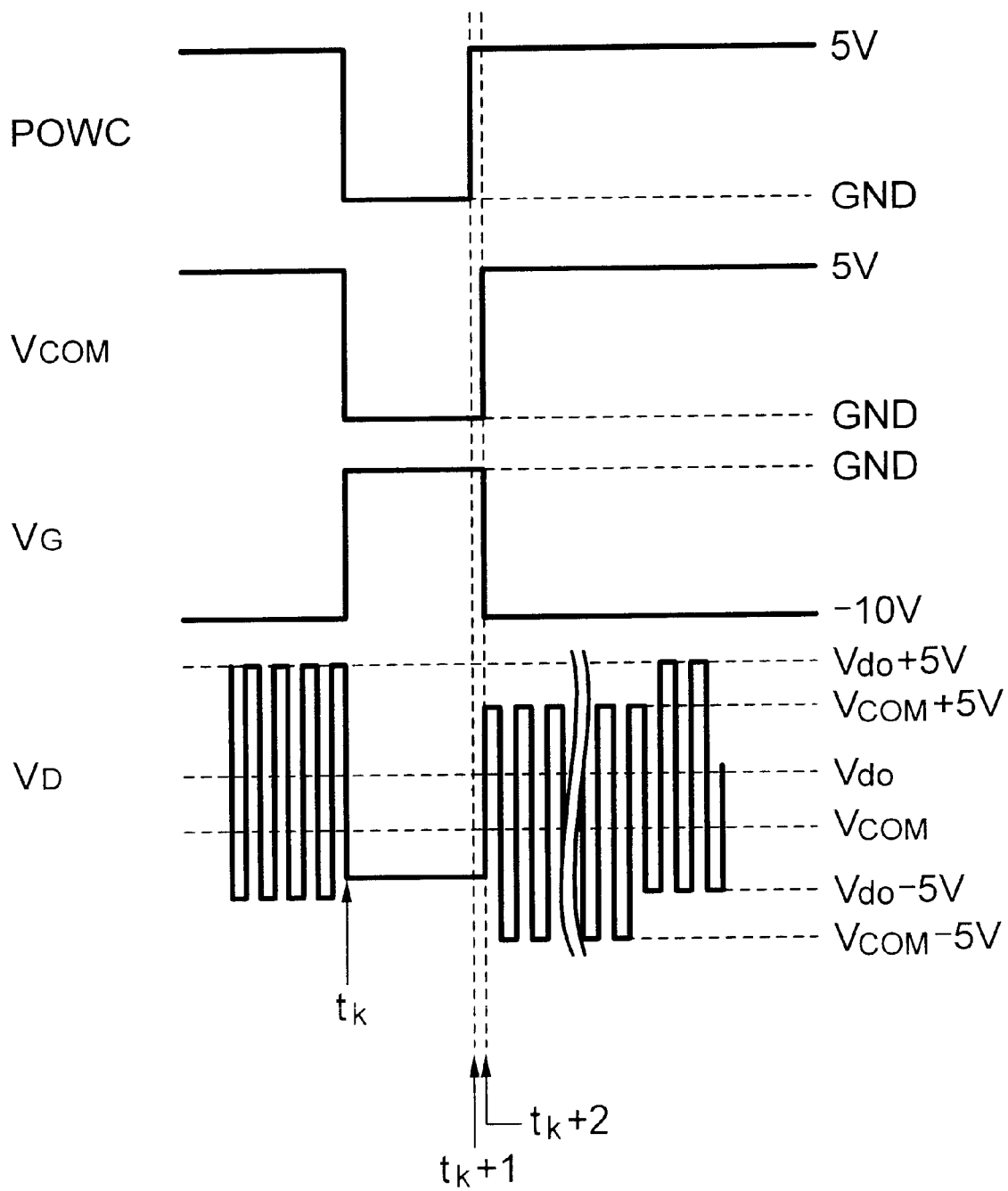
FIG. 16 is a timing chart of the potentials of the electrodes and nodes in the LCD device operating with the input signals of FIG. 15.

Referring to FIG. 16, there are shown signal waveforms in the second example wherein an opposite polarity signal is applied during N frames after the restart of the driving. An absence signal is delivered at time tk by a low level of the judgement signal POWC, and at the same time, the potential $V_G$ of the gate line rises from –10 volts to the ground potential.

By responding to the absence signal, the power source is switched off at tk, with the DC voltage being applied in the pixel until tk+2 after the power source is switched off. At time tk+1, the judgment signal POWC rises from the ground potential to the original 5 volts, followed by a rise of the common electrode potential Vcom from the ground potential to 5 volts and a fall of the gate potential $V_G$ from the ground potential to –10 volts. At the same time, the data line is applied, during consecutive N frames, with the potential $V_D$ wherein the input signal is superposed with the opposite polarity signal (Va–Vb)/N. Then, a normal input signal (video signal) is applied from the start of the (N+1)th frame. In FIG. 16, Vdo represents the center of the amplitude of the normal input signal.

Figure 17:
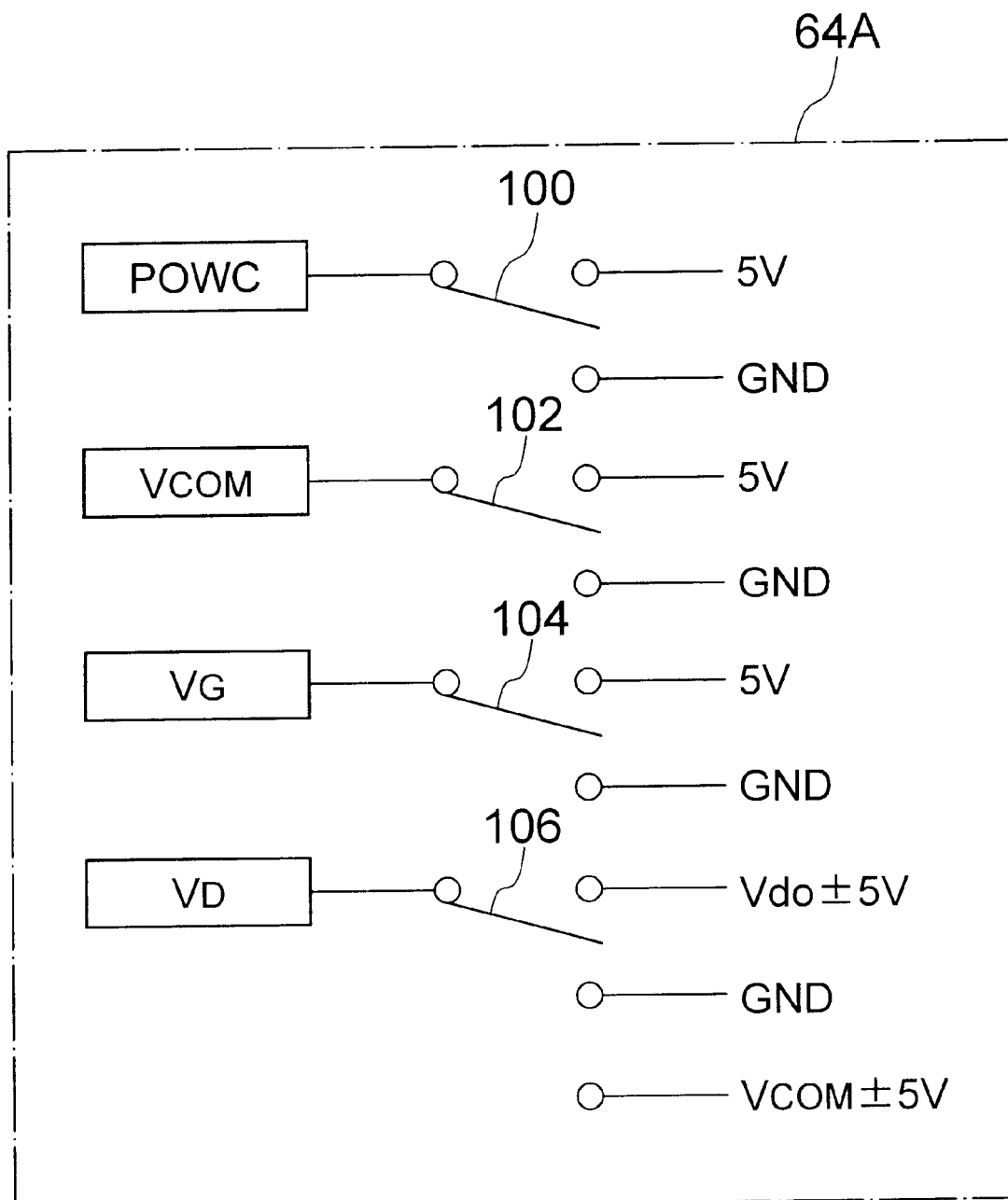
FIG. 17 is an example of the circuit configuration of the video signal processor for processing the signals shown in FIG. 16.

The control of the signal waveforms shown in FIG. 16 is achieved by the configuration of the video signal processor 20 having a switching section 64A shown in FIG. 17. The configuration of the video signal processor 20 is similar to that of the video signal processor shown in FIG. 7 except for the switching section.

The switching section 64A includes switches 100, 102, 104 and 106, each of which switches a corresponding one of the judgement signal POWC, common electrode potential Vcom, the gate electrode potential $V_G$ and the data line potential $V_D$. The judgment signal POWC, the common electrode potential Vcom, the gate electrode potential $V_G$ and the data line potential $V_D$ are switched between 5 volts and zero volts, between 5 volts and zero volt, between –10 volts and zero volt, and among Vd0±5 volts (normal input signal), zero volt and Vcom 5 volts (input signal superposed with an opposite polarity DC voltage or bias voltage), respectively. The signal waveforms shown in FIG. 16 can be achieved by the control of these switches based on the control signal supplied from the control signal generator 62 shown in FIG. 7

A third example of the second embodiment of the present invention will be described with reference to FIGS. 18A to 18C, which show the signal waveforms in the dot reversible driving technique. In the illustrated example, the diffusion of the electric charge stored in each pixel to the LC layer is accelerated by applying a signal having an opposite polarity with respect to the DC voltage stored in the each pixel to the data line before the start of display for the switched signal to prevent the generation of flicker.

In this case, a signal voltage Va–Vb having an opposite polarity is applied during the time period T22 before the input of the low resolution signal VGA in such a way that the product (or integral) Q2 of the time period T22, during which the DC voltage is applied, by the DC voltage Va–Vb does not exceed the integral Q1 of the DC voltage V0 with respect to time within the time period T21, i.e., Q1≧Q2. If Q1=Q2 is achieved, generation of the flicker is avoided, whereas if Q1>Q2, the flicker is reduced.

FIG. 18A shows a signal waveform supplied to the data line corresponding to a pixel in which a positive polarity signal is stored before switching-off of the power source for switching the resolution mode, in the case of the dot reversible driving technique. FIG. 18B shows a signal waveform supplied to the data line corresponding to a pixel in which a negative polarity signal is stored before switching-off of the power source. FIG. 18C shows the signal timing of the absence signal in the judgement signal POWC delivered from the judgement section 60.

As understood from FIG. 18A, an input signal superposed with a signal voltage having an opposite polarity with respect to the stored positive input signal, i.e., a negative DC voltage, having an absolute voltage Va–Vb is applied during the time period T22 before the restart of the driving to the pixel in which a positive polarity signal is stored before the switch-off, and a normal input signal is applied to the same pixel from the restart of the driving for a low resolution mode.

On the other hand, as shown in FIG. 17B. an input signal superposed with a signal having an opposite polarity with respect to the stored negative input signal, i.e., a positive DC voltage Va–Vb is applied during the time period T22 before the restart of the driving to a pixel in which a negative polarity signal is stored before the switch-off, and. a normal input signal is applied to the same pixel from the restart of the driving.

Figure 19:
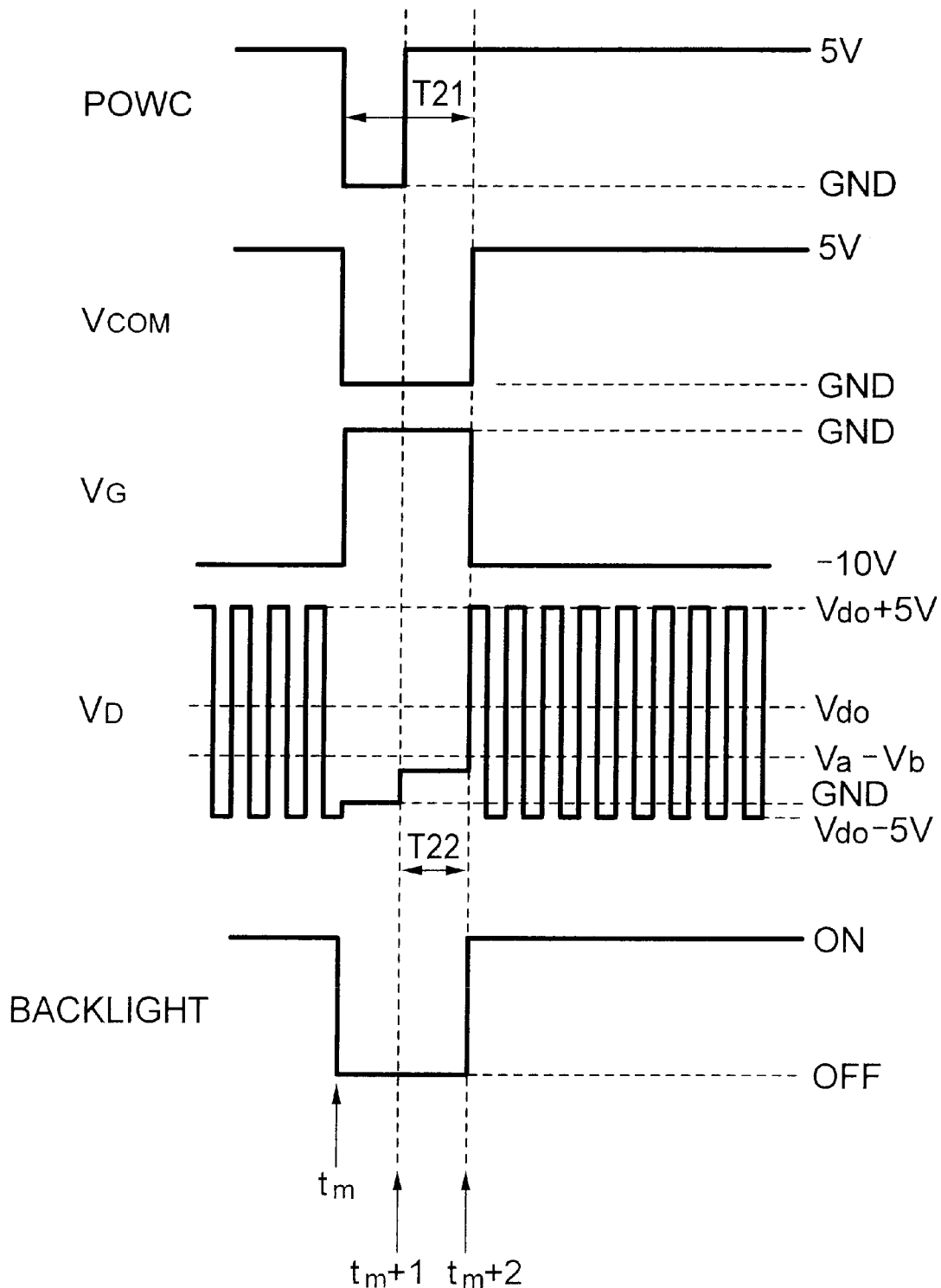
FIG. 19 is a timing chart of the signals applied for canceling the signals shown in FIG. 18.

Referring to FIG. 19, there are shown signal waveforms in the third example wherein an opposite polarity signal is applied before restart of driving. An absence signal in the judgement signal POWC is delivered at time tm a low level of the POWC, and at the same time, the potential of the gate line $V_G$ rises from –10 volts to the ground potential.

Figure 14C:
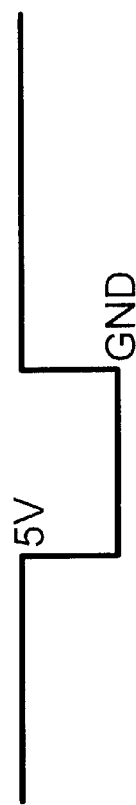

The relationship between the judgement signal and the common electrode potential is similar to that shown in FIG. 14C. More specifically, after an absence signal is delivered at time tm in the judgement signal POWC to lower the level thereof from 5 volts to the ground potential, the common electrode potential Vcom falls from 5 volts to the ground potential, and at the same time, the gate electrode potential $V_G$ rises from –10 volts to the ground potential.

By responding to the absence signal, the power source is switched off at tm, although the negative DC voltage is applied in the pixel until tm+2 after the power source is actually switched off. At time tm+1, the judgment signal POWC rises from the ground potential to the original 5 volts, followed by a rise of the common electrode potential Vcom from the ground potential to 5 volts and a fall of the gate potential from the ground potential to 10 volts. At the same time, the data line is applied, during the time period T22 before restart of the driving at tm+2, with the potential $V_D$ wherein the input signal is superposed with the opposite polarity signal Va–Vb. Then, a normal input signal (video signal) is applied from the restart of the driving At time tm+2, the common electrode potential rises from the ground potential to 5 volts, and the gate electrode potential falls from the ground potential to –10 volts. In FIG. 19, Vd0 is the center of the amplitude of the normal input signal.

The back-light 24 is turned off at time tm and then turned on at time tm+2, wherein a disordered image is not observed due to the turn-off during the time period T22 between tm and tm+2. In an alternative, the back-light may be on during the time period T22 for accelerating the signal transition for quick removal of the residual electric charge.

Figure 20:
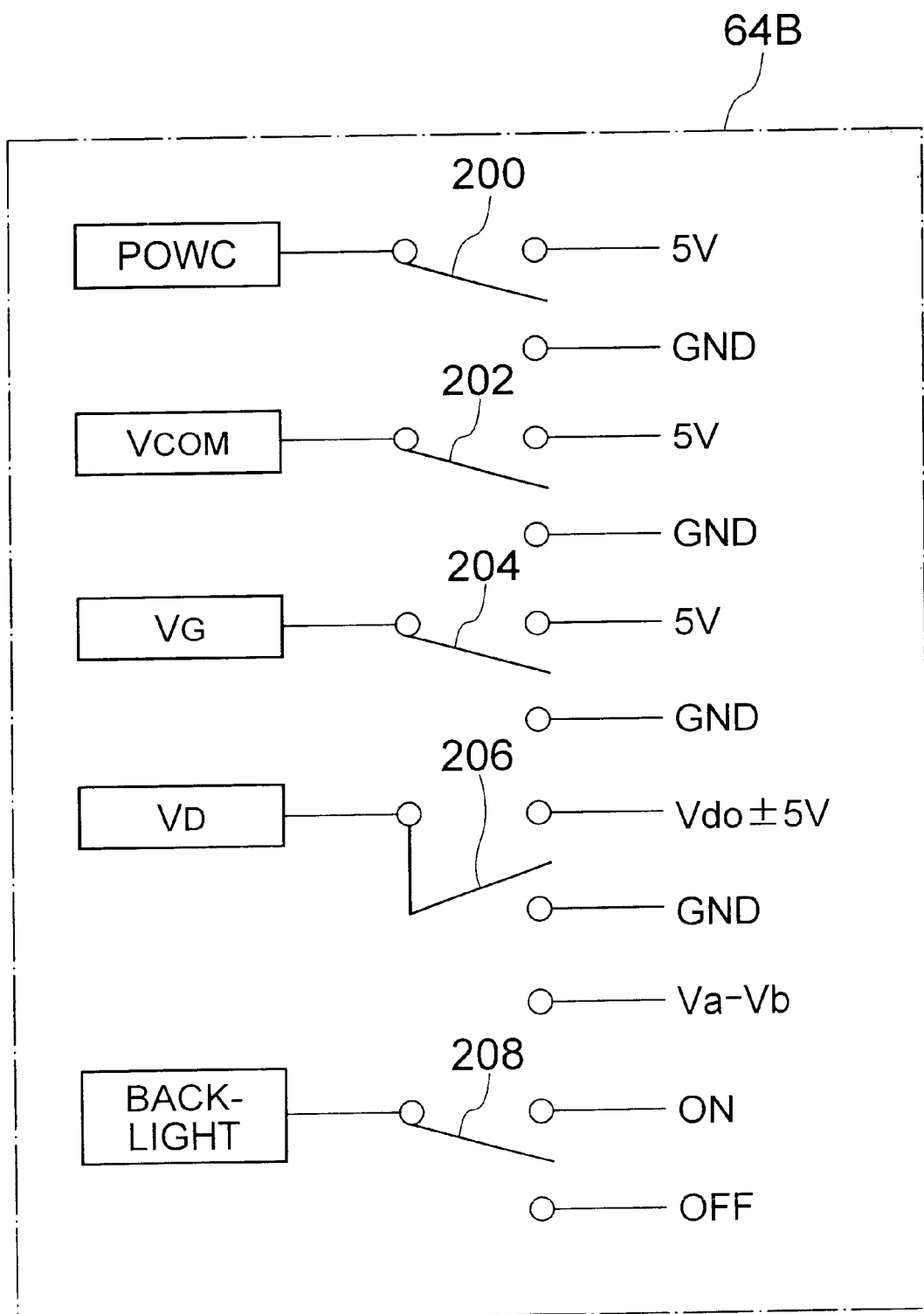
FIG. 20 is another example of the circuit configuration of the video signal processor for processing the signals shown in FIG. 16.

The control of the signal waveforms shown in FIG. 19 is achieved by the configuration of the video signal processor 20 having a switching section 64B shown in FIG. 20. The configuration of the video signal processor is similar to that of the video signal processor shown in FIG. 7 except for the switching section.

The switching section 64B includes switches 200, 202, 204 and 206, each of which switches a corresponding one of the judgement signal POWC, common electrode potential Vcom, the gate electrode potential $V_G$ and the data line potential $V_D$. The judgment signal POWC, the common electrode potential Vcom, the gate electrode potential $V_G$ and the data line potential $V_D$ are switched between 5 volts and zero volts, between 5 volts and zero volt, between –10 volts and zero volt, and among Vd0±5 volts (normal input signal), zero volt and Vcom±5 volts (input signal superposed with an opposite polarity DC voltage or bias voltage), respectively. The back-light 24 is turned off at time tm and then turned on at time tm+2 by switch 28. The signal waveforms shown in FIG. 19 can be achieved by the control of these switches based on the control signal supplied from the control signal generator 62 shown in FIG. 7.

Since the above embodiments are described only for examples, the present invention is not limited to the above embodiments and various modifications or alterations can be easily made therefrom by those skilled in the art without departing from the scope of the present invention.

What is claimed is:

1. An active-matrix LCD (AM-LCD) device comprising a pixel array including a plurality of pixels arranged in a matrix, each of said pixels having a pixel transistor, a pixel electrode connected to a source of said pixel transistor and a common electrode, a plurality of data lines each connected to a drain of each pixel transistor arranged in a column of said pixel array, a plurality of gate lines each connected to a gate of each pixel transistor arranged in a row of said pixel array, a data driver block for driving said data lines, a gate driver block for driving said gate lines, a switching section for switching power source for said pixel array, a control section for controlling said data driver block, said gate driver block and said switching section to drive said pixel array in a reversible driving scheme, wherein said control section controls a mode switching so that a potential difference between said pixel electrode and said common electrode in each pixel has a uniform polarity among said pixels during a switching period after image data for said data line is switched off and before the power source for said pixel array is switched on for said mode switching.

2. The AM-LCD device as defined in claim 1, wherein said control section controls potentials of said pixel electrode, said common electrode and said gate of said pixel transistor during said switching period so that the following relationship satisfies:

$$V_{PMAX} - (Vcomo - Vcom) < V_G + 4 \text{ volts,}$$

wherein $V_{PMAX}$, Vcom, $V_G$ and Ccomo are a maximum potential of said pixel electrode during a normal operation, the potential of said common electrode, the potential of said gate of said pixel transistor and the potential of said common electrode during a normal operation, respectively.

3. The AM-LCD device as defined in claim 2, wherein said control section controls said mode switching so that a duration during which both relationships $V_G=0$ and Vcom≦–4 volts satisfy continues five milliseconds or longer.

4. The AM-LCD device as defined in claim 1, further comprising a back-light for irradiating said pixels wherein said back-light is turned off during said switching period.

5. The AM-LCD device as defined in claim 1, wherein said mode switching is conducted for switching between input signals or between resolution modes.

6. An active-matrix LCD (AM-LCD) device comprising a pixel array including a plurality of pixels arranged in a matrix, each of said pixels having a pixel transistor, a pixel electrode connected to a source of said pixel transistor and a common electrode, a plurality of data lines each connected to a drain of each pixel transistor arranged in a column of said pixel array, a plurality of gate lines each connected to a gate of each pixel transistor arranged in a row of said pixel array, a data driver block for driving said data lines, a gate driver block for driving said gate lines, a switching section for switching power source for said pixel array, a control section for controlling said data driver block, said gate driver block and said switching section to drive said pixel array in a reversible driving scheme, wherein said control section controls a mode switching so that at least some of said pixels are applied with a minimum potential level during a switching period after image data for said data line is switched off and before the power source for said pixel array is switched on for said mode switching.

7. The AM-LCD device as defined in claim 6, wherein said application of minimun potential level controls potentials of said pixels before switching off said power source so that a potential difference between said pixel electrode and said common electrode in each pixel has a uniform polarity among said pixels.

8. The AM-LCD device as defined in claim 6, wherein said control section controls potentials of said pixel electrode, said common electrode and said gate of said pixel transistor before the power source is switched off so that the following relationship satisfies:

$$V_{PMAX} - (Vcomo - Vcom) < V_G + 4 \text{ volts},$$

wherein $V_{PMAX}$, Vcom, $V_G$ and Ccomo are a maximum potential of said pixel electrode during a normal operation, the potential of said common electrode, the potential of said gate of said pixel transistor and the potential of said common electrode during a normal operation, respectively.

9. The AM-LCD device as defined in claim 8, wherein said control section controls so that a duration during which both VG=0 and Vcom≦−4 volts satisfy continues five milliseconds or longer.

10. The AM-LCD device as defined in claim 6, further comprising a back-light for irradiating said pixels wherein said back-light is turned off during said mode switching.

11. The AM-LCD device as defined in claim 1, wherein said mode switching is conducted for switching between input signals or between resolution modes.

12. An active-matrix LCD (AM-LCD) device comprising a pixel array including a plurality of pixels arranged in a matrix, each of said pixels having a pixel transistor, a pixel electrode connected to a source of said pixel transistor and a common electrode, a plurality of data lines each connected to a drain of each pixel transistor arranged in a column of said pixel array, a plurality of gate lines each connected to a gate of each pixel transistor arranged in a row of said pixel array, a data driver block for driving said data lines, a gate driver block for driving said gate lines, a switching section for switching power source for said pixel array, a control section for controlling said data driver block, said gate driver block and said switching section to drive said pixel array in a reversible driving scheme, wherein said control section controls a mode switching so that said pixel electrode and said common electrode are applied therebetween with a DC signal having an opposite polarity with respect to a polarity of a DC voltage stored between said pixel electrode and said common electrode in each pixel before switching off power the source for said pixel array.

13. The AM-LCD device as defined in claim 11, wherein said DC signal is applied after a restart of display for an input signal, and superposed with the input signal.

14. The AM-LCD device as defined in claim 12, wherein said DC signal is applied before a restart of display for an input signal.

15. The AM-LCD device as defined in claim 12, further comprising a back-light for irradiating said pixels wherein said back light is turned off during said switching period.

16. The AM-LCD device as defined in claim 12, wherein said mode switching is conducted for switching between input signals or between resolution modes.

* * * * *